United States Patent
Ohmiya

(10) Patent No.: US 8,842,147 B2
(45) Date of Patent: Sep. 23, 2014

(54) OPTICAL SCANNING DEVICE, IMAGE FORMING APPARATUS, AND OPTICAL SCANNING METHOD

(75) Inventor: Satoshi Ohmiya, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 601 days.

(21) Appl. No.: 13/047,170

(22) Filed: Mar. 14, 2011

(65) Prior Publication Data

US 2011/0228032 A1    Sep. 22, 2011

(30) Foreign Application Priority Data

Mar. 18, 2010 (JP) .................. 2010-063037
Mar. 7, 2011 (JP) .................. 2011-049338

(51) Int. Cl.
| B41J 15/14 | (2006.01) |
| B41J 27/00 | (2006.01) |
| B41J 2/435 | (2006.01) |
| B41J 2/47  | (2006.01) |
| G02B 26/12 | (2006.01) |
| G06K 15/12 | (2006.01) |
| G02B 27/14 | (2006.01) |

(52) U.S. Cl.
CPC .............. B41J 2/473 (2013.01); G02B 26/123 (2013.01); G06K 15/129 (2013.01); G02B 27/144 (2013.01)
USPC ............ 347/241; 347/237; 347/247; 347/256

(58) Field of Classification Search
USPC ......... 347/232, 233, 234, 237, 238, 241, 243, 347/247, 248, 249, 256, 259, 260, 261; 359/196.1, 197.1, 198.1, 200.1, 201.1, 359/201.2, 203.1, 204.1, 204.2, 204.4, 359/212.1, 212.2, 216.1–217.1, 223.1, 359/226.1, 226.2
See application file for complete search history.

(56) References Cited

U.S. PATENT DOCUMENTS

| 7,145,705 B2 * | 12/2006 | Hayashi ............. 359/204.1 |
| 7,589,878 B2 * | 9/2009 | Nakamura et al. ...... 359/204.2 |
| 2007/0133016 A1 | 6/2007 | Ohmiya |
| 2007/0285716 A1 | 12/2007 | Ohmiya |

FOREIGN PATENT DOCUMENTS

| JP | 3824566 | 7/2006 |
| JP | 2006-284822 | 10/2006 |

* cited by examiner

*Primary Examiner* — Uyen Chau N Le
*Assistant Examiner* — John M Bedtelyon
(74) *Attorney, Agent, or Firm* — Oblon, Spivak, McClelland, Maier & Neustadt, L.L.P.

(57) ABSTRACT

An optical scanning device includes: light sources emitting first beams having colors; a beam splitting unit splitting the first beams into second beams; a deflecting unit including reflecting members, each corresponding to one of the second beams and each performing deflection scanning of the second beams; an optical system for image formation of the second beams scanning on target surfaces that have been assigned with colors corresponding to the first beams; a detecting unit for detecting which of the reflecting member corresponds to the second beam; an interchanging unit for obtaining data of a lines corresponding to each of the first beams and interchanging the data of the lines based on a detection result; and a light source control unit for controlling the light sources in such a way that the light sources emit the first beams in accordance with the data of the lines interchanged.

20 Claims, 16 Drawing Sheets

TRANSFER PAPER CONVEYING DIRECTION

OPTICAL SCANNING DEVICE, IMAGE FORMING APPARATUS, AND OPTICAL SCANNING METHOD

CROSS-REFERENCE TO RELATED APPLICATIONS

The present application claims priority to and incorporates by reference the entire contents of Japanese Patent Application No. 2010-063037 filed in Japan on Mar. 18, 2010 and Japanese Patent Application No. 2011-049338 filed in Japan on Mar. 7, 2011.

BACKGROUND OF THE INVENTION

1. Field of the Invention

The present invention relates to an optical scanning device, an image forming apparatus, and an optical scanning method.

2. Description of the Related Art

Typically, regarding electrophotographic image forming apparatuses such as laser printers, facsimileing devices, and digital multifunction peripherals; the advancement in color image formation and the enhancement in operating speed has lead to the prevalence of tandem-type image forming apparatuses that include a plurality of photosensitive drums. In a tandem-type image forming apparatus, each of a plurality of photosensitive drums needs to be independently subjected to light. In that regard, a technology is known with which, as the number of photosensitive drums in a tandem-type image forming apparatus increases, the number of light sources that emit light and that are disposed in an optical scanning device of the tandem-type image forming apparatus can also be increased in proportion to the number of photosensitive drums.

Meanwhile, with an aim of speeding-up the operation of outputting images while standardizing the components, a technology has been developed to perform image formation in a plurality of colors using a single light source (for example, Japanese Patent Application Laid-open No. 2006-284822). More particularly, in a tandem-type image forming apparatus, an opposite scanning optical system is used in which optical paths for scanning the light of a plurality of colors are provided with on the left side and on the right side of a deflecting unit, including such as a polygon motor, that deflects light. With the use of such a plurality of light sources and each being able to emit light of a plurality of colors, the operations can be speeded-up.

However, in a multibeam-type opposite scanning optical system in which a plurality of light sources are installed, the configuration of the optical system or the configuration of the optical components may lead to a misalignment of each beam (light beam) in the sub-scanning direction with respect to a transfer paper sheet. Hence, image formation cannot be performed in an appropriate manner.

Therein, as a method to stabilize the scanning line alignment in the sub-scanning direction, the wire connection of a harness that establishes an image data connection from a control unit to the light sources is nested, or the layouts of control boards on which the light sources are mounted are developed on an individual basis.

However, if a situation occurs when each beam has a different alignment in the sub-scanning direction with respect to the transfer paper sheet, then it becomes difficult to standardize the components even after implementing the technology disclosed in Japanese Patent Application Laid-open No. 2006-284822. Moreover, in order to avoid misalignment in the sub-scanning direction; although it is conceivable to implement a method of changing the image data connection established from a control unit to the light sources, that method is difficult to implement from the perspective of hardware configuration.

SUMMARY OF THE INVENTION

It is an object of the present invention to at least partially solve the problems in the conventional technology.

According to an aspect of the present invention, there is provided an optical scanning device including: an obtaining unit for obtaining color image data; a plurality of light sources emitting a plurality of first beams having colors associated therewith; a beam splitting unit for splitting each of the plurality of first beams into second beams; a deflecting unit including a plurality of reflecting members each corresponding to one of the plurality of second beams and each performing deflection scanning of the second beams split from corresponding first beam; an optical system for performing image formation of the plurality of second beams that have been subjected to deflection scanning on target surfaces for scanning, from among a plurality of target surfaces for scanning having been assigned with different colors, that have been assigned with colors corresponding to the first beams from which the second beams are split; a light receiving unit for detecting the second beams that have been subjected to deflection scanning; a detecting unit for detecting, based on a detection result of the light receiving unit, which of the reflecting member corresponds to the second beam that has been detected; an interchanging unit for obtaining, from the color image data, data of a plurality of lines corresponding to each of the plurality of first beams and interchanging the data of the lines that has been obtained based on a detection result of the detecting unit; and a light source control unit for controlling the light sources in such a way that the light sources emit the first beams in accordance with the data of the lines that has been interchanged by the interchanging unit.

According to another aspect of the present invention, there is provided an image forming apparatus including: an image forming device; and the optical scanning device mentioned above.

According to still another aspect of the present invention, there is provided an optical scanning method implemented in an optical scanning device including a plurality of light sources emitting a plurality of first beams having colors associated therewith; a beam splitting unit for splitting each of the plurality of first beams into second beams; a deflecting unit including a plurality of reflecting members each corresponding to one of the plurality of second beams and each performing deflection scanning of the second beams split from corresponding first beam; an optical system for performing image formation of the plurality of second beams that have been subjected to deflection scanning on target surfaces for scanning, from among a plurality of target surfaces for scanning having been assigned with different colors, that have been assigned with colors corresponding to the first beams from which the second beams are split; and a light receiving unit for detecting the second beams that have been subjected to deflection scanning, the optical scanning method including: obtaining color image data; detecting, based on a detection result of the light receiving unit, which of the reflecting member corresponds to the second beam that has been detected; interchanging that includes obtaining, from the color image data, data of a plurality of lines each corresponding to each of the first beams, and interchanging the data of the lines based on the detected result at the detecting; and controlling the light sources in such a way that the first beams, corresponding to the data that has been interchanged, are emitted.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical scanning device, an image forming apparatus, and an optical scanning method according to the present invention are described in detail below with reference to the accompanying drawings. In the following embodiments, the explanation is given under the assumption that an image forming apparatus according to the present invention is a multifunction peripheral (MFP) having at least two functions from among copying function, printing function, scanning function, and facsimileing function. However, the present invention is not limited to these exemplary embodiments.

First Embodiment

Figure 1:
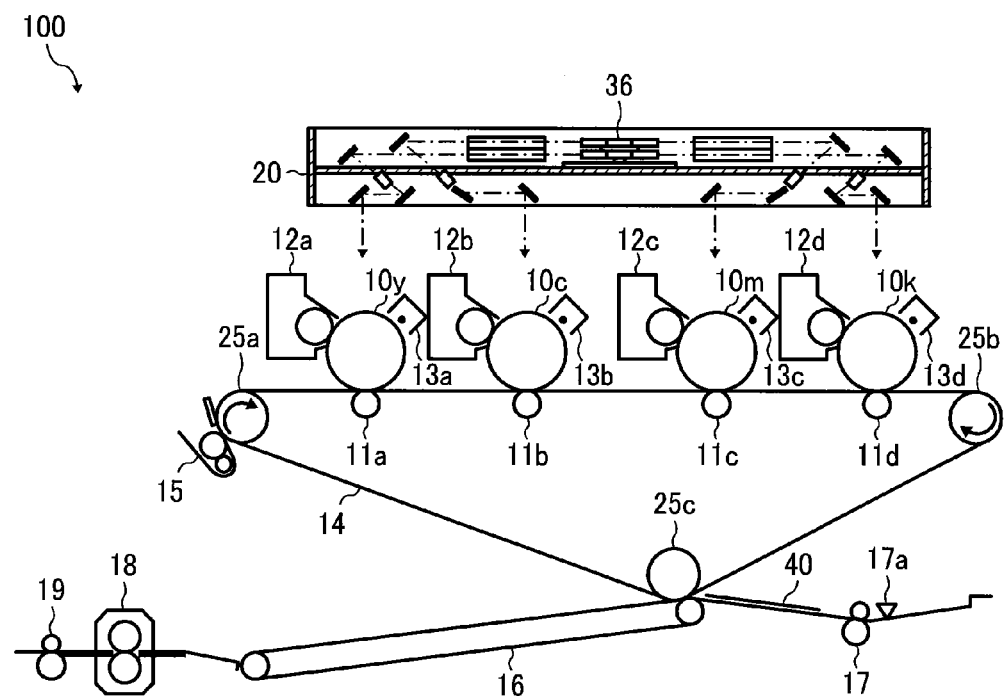
FIG. 1 is a schematic diagram of an image forming apparatus according to a first embodiment of the present invention.

FIG. 1 is a schematic diagram of an image forming apparatus 100 according to a first embodiment of the present invention. As illustrated in FIG. 1, the image forming apparatus 100 mainly includes four photosensitive drums 10y to 10k, four charging units 13a to 13d, four toner cartridges 12a to 12d serving as developing units, four transfer rollers 11a to 11d, three intermediate transfer rollers 25a to 25c, an intermediate transfer belt 14, an intermediate-transfer-belt cleaning device 15, a conveying belt 16, a registration roller 17, a paper feeding registration sensor 17a, a fixing device 18, a discharging device 19, and an optical scanning device 20.

When a start button of the image forming apparatus 100 is pressed or when a print start signal issued by a print host is validated, the photosensitive drums 10 are subjected to timing-controlled beams by the optical scanning device 20. Herein, the optical scanning device 20 makes use of a polygon motor (not illustrated) and a deflecting unit 36 for performing scanning with beams emitted by light sources (not illustrated), and performs writing on the surfaces of the photosensitive drums 10 using the beams so that electrostatic latent images are formed on the photosensitive drums 10.

The electrostatic latent images are then developed, using toners that are supplied by the toner cartridges 12a to 12d. As a result, a single-color image is formed on each photosensitive drum 10. As illustrated in FIG. 1, to the photosensitive drum 10y that is the first photosensitive drum is attached the yellow (Ye) toner so that a yellow image is formed thereon. That yellow image is then transferred onto the intermediate transfer belt 14 by the transfer roller 11a. Subsequently, to the photosensitive drum 10c that is the second photosensitive drum is attached the cyan (Cy) toner so that a cyan image is formed thereon. That cyan image is then transferred onto the intermediate transfer belt 14 by the transfer roller 11b. Herein, since the yellow image has already been transferred onto the intermediate transfer belt 14, the cyan image is superimposed on that yellow image.

Subsequently, to the photosensitive drum 10m that is the third photosensitive drum is attached the magenta (Ma) toner so that a magenta image is formed thereon. That magenta image is then transferred onto the intermediate transfer belt 14 by the transfer roller 11c. Herein, since the yellow image and the cyan image have already been transferred onto the intermediate transfer belt 14, the magenta image is superimposed on the yellow and cyan images. Lastly, to the photosensitive drum 10k that is the fourth photosensitive drum is attached the black (Bk) toner so that a black image is formed thereon. That black image is then transferred onto the intermediate transfer belt 14 by the transfer roller 11*d*. Herein, the black image is superimposed on the yellow image, the cyan image, and the magenta image that have already been transferred onto the intermediate transfer belt 14. When the intermediate transfer belt 14 is rotary-driven by the intermediate transfer rollers 25*a* to 25*c* that serve as driving rollers, the toner images of four colors that have been transferred on the intermediate transfer belt 14 are conveyed in a predetermined direction. By superimposing the toner images of four colors on the intermediate transfer belt 14, a synthesized color image is formed. Herein, although the toner images are formed in the sequence of yellow, cyan, magenta, and black colors; the color sequence in image formation is not limited to that case.

Meanwhile, when a job start signal is validated, the image forming apparatus 100 ensures that transfer paper sheets 40 are separated and fed one by one from a paper feeding device. When the paper feeding registration sensor 17*a* detects a transfer paper sheet 40, the image forming apparatus 100 temporarily stops paper feeding. Then, in synchronization with the timing at which the synthesized color image is conveyed on the intermediate transfer belt 14, the image forming apparatus 100 rotates the registration roller 17 so that the detected transfer paper sheet 40 is sent to a nip between the intermediate transfer belt 14 and a transfer unit at which the intermediate transfer roller 25*c* and the conveying belt 16 make contact with each other via the intermediate transfer belt 14. At the transfer unit, the synthesized color image gets transferred onto the transfer paper sheet 40. Then, the fixing device 18 applies heat and pressure to the transfer paper sheet 40 having the synthesized color image transferred thereon. Consequently, the synthesized color image gets fixed on the transfer paper sheet 40. After the fixing operation is complete, the transfer paper sheet 40 is discharged by a discharging roller attached to the discharging device 19, and is stacked on a catch tray.

Figure 2:
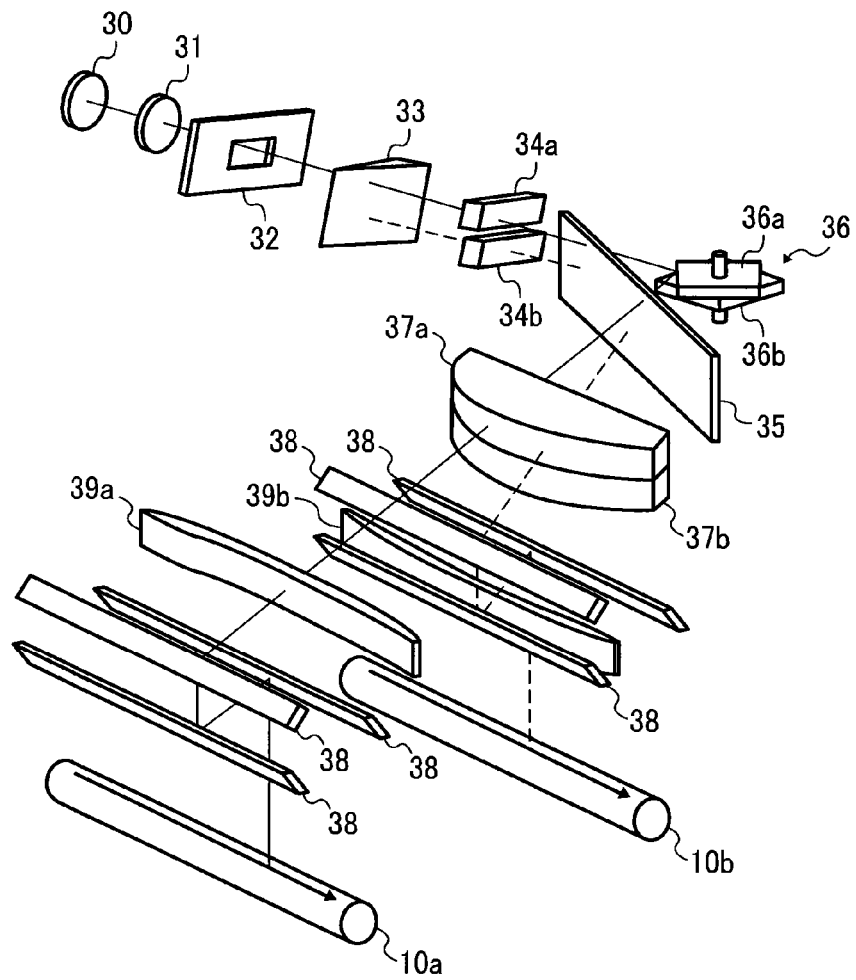
FIG. 2 is an illustrative diagram of a hardware configuration of an optical scanning device according to the first embodiment.

Explained below are the details regarding the optical scanning device 20. FIG. 2 is an illustrative diagram of a hardware configuration of the optical scanning device 20. As illustrated in FIG. 2, the optical scanning device 20 mainly includes a light source 30, a coupling lens 31, an aperture 32, a half-mirror prism 33, cylindrical lenses 34*a* and 34*b*, a deflecting unit 36, a soundproof glass 35, first scanning lenses 37*a* and 37*b*, a mirror 38, and second scanning lenses 39*a* and 39*b*. Herein, for the sake of simplicity in explanation, only one light source 30 is illustrated in FIG. 2. However, in the first embodiment, the optical scanning device 20 actually includes two light sources 30.

Each light source 30 includes a plurality of light emitting units (not illustrated). In the present embodiment, the explanation is given for a case when two beams are emitted from two light emitting units. Each light source 30 can be, for example, a semiconductor laser array element or a surface-emitting semiconductor laser array element. However, the light sources 30 are not limited to laser arrays, and can be any type of devices including a plurality of light emitting units. For example, each light source 30 can be configured using a plurality of light source elements each including a single light emitting unit. Each light source 30 emits a first beam that is a divergent beam of light and that is then converted by the coupling lens 31 into a weak convergent light or a parallel beam of light, or into a weak divergent beam of light. With respect to the first beam that has passed through the coupling lens 31, the aperture 32 then stabilizes the beam diameter on the target surface for scanning.

Figure 3:
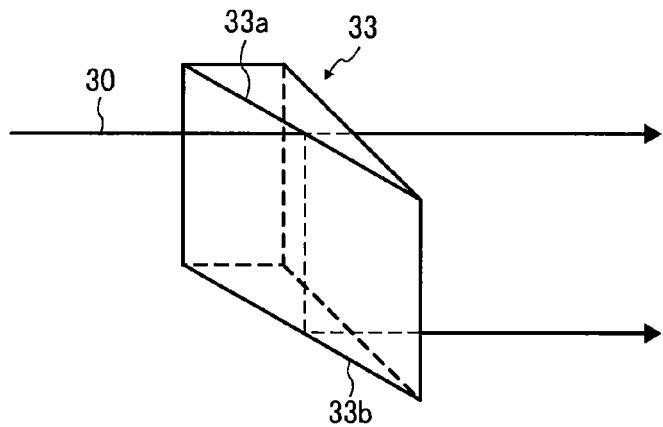
FIG. 3 is a sub-scanning cross-sectional view of a half-mirror prism in the optical scanning device according to the first embodiment.

The first beam that has passed through the aperture 32 is split into two beams, referred to as second beams, at the half-mirror prism 33. Explained below are the details regarding the half-mirror prism 33. FIG. 3 is a sub-scanning cross-sectional view of the half-mirror prism 33. As illustrated in FIG. 3, the half-mirror prism 33 includes a half mirror 33*a* that splits the incident first beam in the proportion of 1:1 of the transmitted light and the reflected light. In addition, the half-mirror prism 33 includes a fully reflecting surface 33*b* having the function of changing the direction of travel of beams. Upon passing through the aperture 32, the first beam falls on the half-mirror prism 33. At that time, the first beam gets split into an upper second beam and a lower second beam at the half mirror 33*a*. The directions of the split second beams change at the fully reflecting surface 33*b* in such a way that the second beams fall on polygon mirrors 36*a* and 36*b* (described later) that are disposed at upper and lower levels.

Herein, although a half-mirror prism is used, an optical system device having the same functionality can also be configured by using a stand-alone half mirror and a commonly-used mirror. Moreover, the proportion of light separation at the half mirror is not limited to 1:1 as mentioned above but can be appropriately set in accordance with the conditions of other optical system devices in use.

Returning to the explanation with reference to FIG. 2, the two second beams, output from the half-mirror prism 33, are converted into latent images, which are elongated in the main-scanning direction, in the vicinity of a deflection/reflection surface by the cylindrical lenses 34*a* and 34*b*, which are disposed at the upper and lower levels corresponding to the two second beams.

The deflecting unit 36 includes the polygon mirrors 36*a* and 36*b* that are multi-sided mirrors disposed at the upper and lower levels along a rotational axis. The deflecting unit 36 rotates the polygon mirrors 36*a* and 36*b* for the purpose of beam scanning. The polygon mirror 36*a* is disposed at the upper level of the deflecting unit 36; while the polygon mirror 36*b* is disposed at the lower level of the deflecting unit 36. With respect to the polygon mirror 36*a*, the polygon mirror 36*b* is disposed on the peripheral edge with a shift of an angle $\phi$ in the rotating direction from a superposed state around the rotational axis of the deflecting unit 36. Meanwhile, the polygon mirrors 36*a* and 36*b* can be configured to be an integrated entity or assembled as separate entities. With the polygon mirrors 36*a* and 36*b* configured as mentioned above, the deflecting unit 36 performs deflection scanning of the second beams, and makes the two beams fall on photosensitive drums 10*a* and 10*b*, respectively.

Figure 4A:
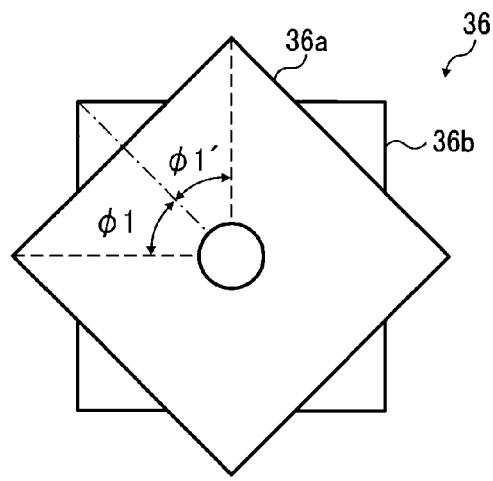
FIG. 4A is a top, cross-sectional view of a deflecting unit in the optical scanning device according to the first embodiment.
Figure 4B:
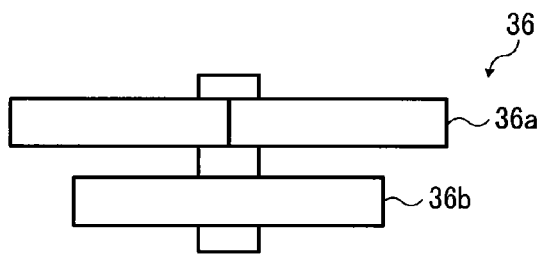
FIG. 4B is a side view of the deflecting unit in the optical scanning device according to the first embodiment.
Figure 4C:
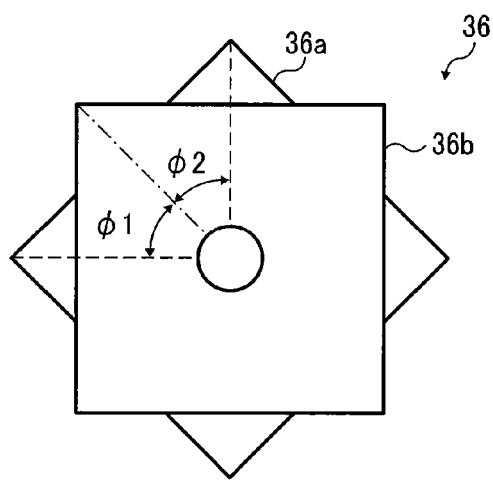
FIG. 4C is a bottom, cross-sectional view of the deflecting unit in the optical scanning device according to the first embodiment.

Explained below are the details regarding the deflecting unit 36. FIG. 4A is a top, cross-sectional view of the deflecting unit 36; FIG. 4B is a side view of the deflecting unit 36; and FIG. 4C is a bottom, cross-sectional view of the deflecting unit 36. As illustrated in FIG. 4A, consider a case when a shift angle $\phi_1$ in the rotation direction of the polygon mirror 36*a* is identical to a shift angle $\phi_1'$ in the rotation direction of the polygon mirror 36*b*. Then, with respect to the number of mirror sides "M" of the polygon mirrors 36*a* and 36*b*; the shift angles $\phi$ can be represented as $\pi/M$. When the number of mirror sides (M) is four, the shift angles $\phi_1$ and $\phi_1'$ are equal to $\pi/4$, that is, equal to 45°. When the shift angles $\phi$ are 45°, the time interval from the start of scanning at the upper polygon mirror 36*a* up to the start of scanning at the lower polygon mirror 36*b* is identical to the time interval from the start of scanning at the lower polygon mirror 36*b* up to the start of scanning by the upper polygon mirror 36*a*. In that case, it is not possible to determine the timing at which a beam is reflected from the upper level and the timing at which a beam is reflected from the lower level for the purpose of scanning.

Therein, the value of the shift angles ϕ is set to) "(180°)÷(number of angles that the polygon mirrors 36a and 36b have)+(predetermined amount of angle shift)" or set to) "(180°)÷(number of angles that the polygon mirrors 36a and 36b have)−(predetermined amount of angle shift)". More particularly, it is ensured that the shift angles ϕ1 and ϕ1' of the mirror sides are not identical. For example, as illustrated in FIG. 4A, when the lower polygon mirror 36b is viewed from the upper polygon mirror 36a, the shift angle of the mirror side is considered to be the shift angle ϕ1. Similarly, as illustrated in FIG. 4C, when the upper polygon mirror 36a is viewed from the lower polygon mirror 36b, the shift angle of the mirror side is considered to be a shift angle ϕ2. Then, the mirror sides are set with an angular difference ±α in such a way that the $\phi 1=\pi/M+\alpha$ and $\phi 2=\pi/M-\alpha$ are satisfied.

For example, when there are four mirror sides and when the amount of angle shift α is 1°, then ϕ1=46° and ϕ2=44°. In that case, the time interval from the start of scanning at the upper polygon mirror 36a up to the start of scanning at the lower polygon mirror 36b becomes longer than the time interval from the start of scanning at the lower polygon mirror 36b up to the start of scanning at the upper polygon mirror 36a. Hence, when the time interval is longer, it can be determined that the scanning was performed at the upper polygon mirror 36a; and when the time interval is shorter, it can be determined that the scanning was performed at the lower polygon mirror 36b. Thus, by setting the amount of angle shift α, it becomes possible to determine whether the scanning is performed at the upper polygon mirror or the lower polygon mirror by referring to the time interval.

As far as the range of the amount of angle shift α is concerned, the component tolerance at the time of assembling the polygon mirrors 36a and 36b happens to be a major parameter. The component tolerance is the difference between a defined value and an actual value, and represents a regulated acceptable range. Moreover, the component tolerance is the acceptable difference during the machine work. For example, assume that the component tolerance is ±0.25°. In that case, even if the value of α is equal to 0.25, then the shift angle ϕ1 might become equal to the shift angle ϕ2 thereby making it difficult to distinguish between the upper polygon mirror and the lower polygon mirror. If the value of α is smaller than 0.25, then the magnitude relation between the shift angles ϕ1 and ϕ2 might be reversed. In that case, although it is possible to distinguish between the upper polygon mirror and the lower polygon mirror, the result thereof might be reversed for the upper and lower levels. For such reasons, the value of α needs to be greater than 0.25.

Similarly, assume that the component tolerance is ±0.5°. In that case, even if the value of α is equal to 0.5, then the shift angle ϕ1 becomes equal to the shift angle ϕ2 thereby making it difficult to distinguish between the upper polygon mirror and the lower polygon mirror. Hence, the value of α needs to be greater than 0.5. For example, the value of α can be set to 0.5005, which is greater than 0.5 by just 0.0005. However, since counting is done using a high-speed clock and since a difference greater than few hundreds is present in the values counted as the time intervals between detection signals, it is possible enough to distinguish between the upper polygon mirror and the lower polygon mirror.

Consequently, when the component tolerance is ±0.25°, the minimum value of the amount of angle shift α can be a value greater than the absolute value 0.25° of the component tolerance. For example, the minimum value of the amount of angle shift α can be 0.2505°. Similarly, when the component tolerance is ±0.5°, the minimum value of the amount of angle shift α can be a value greater than the absolute value 0.5° of the component tolerance. For example, the minimum value of the amount of angle shift α can be 0.5005°. On the other hand, regarding the maximum value of the amount of angle shift α; an increase in the value of α leads to a decrease in the angle of deflection, which corresponds to a valid writing width for scanning a photosensitive drum at a mirror side that has a shirt interval of detection signals. That makes it necessary to substantially increase the speed of the control clock used in scanning of the main-scanning width. Hence, with respect to the shift angle of 45°, it is desirable to set the maximum value of the amount of angle shift α to about 0.9° to 1.35°, which is about 2% to 3% of the shift angle. Thus, in the optical scanning device 20; by disposing the deflecting unit 36 with the amount of angle shift α set therein, it becomes possible to determine whether scanning is done at the upper polygon mirror or the lower polygon mirror.

Figure 5A:
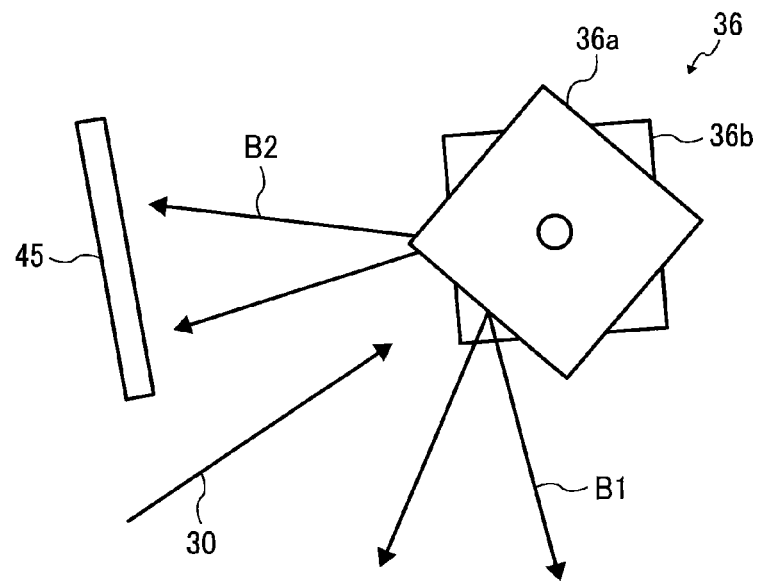
FIGS. 5A and 5B are illustrative diagrams of exemplary positions of beams scanned at polygon mirrors in the optical scanning device according to the first embodiment.
Figure 5B:
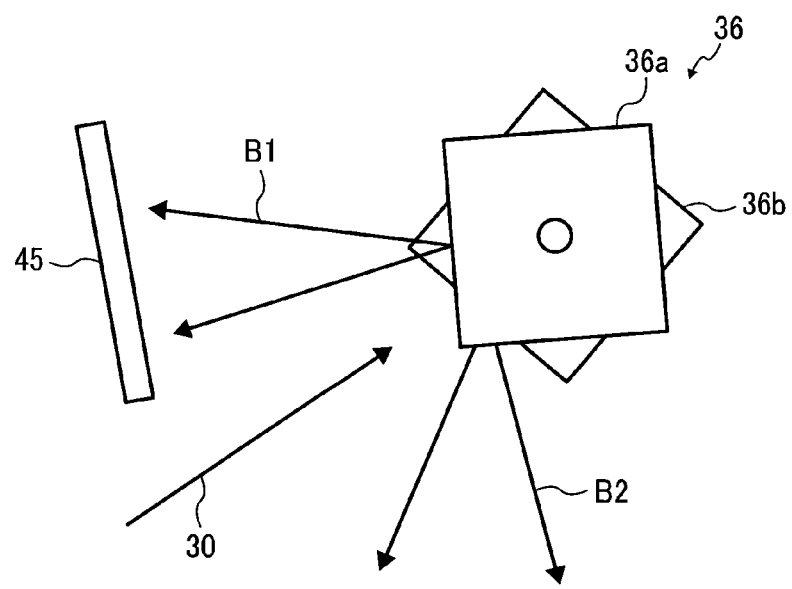

Given below is the explanation regarding the positions of beams scanned at the polygon mirrors 36a and 36b. FIGS. 5A and 5B are illustrative diagrams of exemplary positions of beams scanned at the polygon mirrors 36a and 36b. As illustrated in FIGS. 5A and 5B, a light blocking member 45 is disposed in one of the two directions in which the second beams are simultaneously reflected from the polygon mirrors 36a and 36b. Herein, the second beams reflected from the polygon mirror 36a are referred to as beams B1, and the second beams reflected from the polygon mirror 36b are referred to as beams B2. As illustrated in FIG. 5A, when the photosensitive drum 10 (target surface for scanning) is scanned with the beams B1; the light blocking member 45 blocks the beams B2 so as to prevent the beams B2 from reaching the target surface for scanning. In contrast, as illustrated in FIG. 5B, when the target surface for scanning is scanned with the beams B2; the light blocking member 45 blocks the beams B1 so as to prevent the beams B1 from reaching the target surface for scanning.

Figure 6:
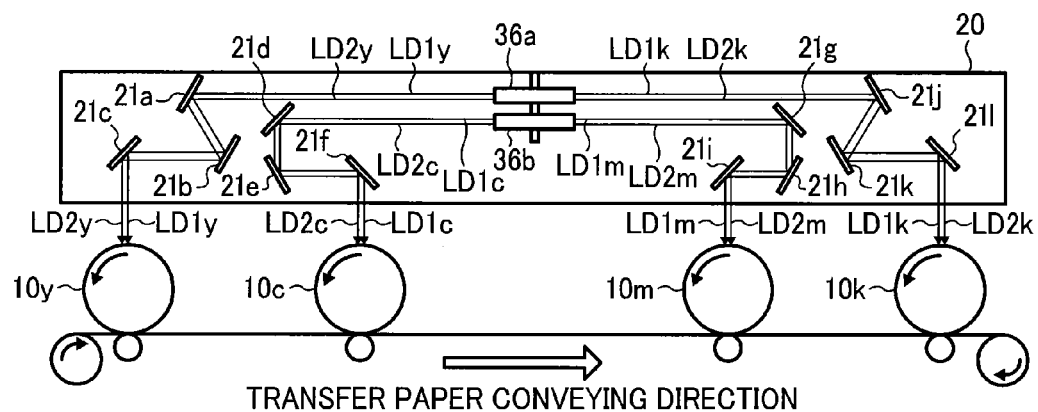
FIG. 6 is an illustrative diagram for explaining the operations performed between the optical scanning device and photosensitive drums according to the first embodiment.
Figure 6:
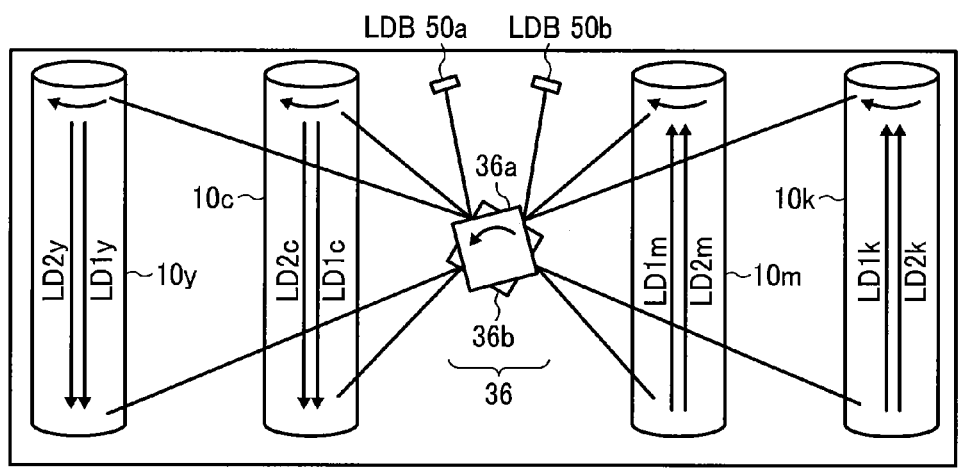

Explained below are the operations performed between the optical scanning device 20 and the photosensitive drums 10 according to the first embodiment. FIG. 6 is an illustrative diagram for explaining the operations performed between the optical scanning device 20 and the photosensitive drums 10 according to the first embodiment. As illustrated in FIG. 6, the optical scanning device 20 includes an LDB 50a and an LDB 50b that are the control boards having the light sources 30 mounted thereon; includes the polygon mirrors 36a and 36b for reflecting the second beams (LD1 and LD2), each of which is split from the first beam emitted from the LDB 50a and the LDB 50b, respectively; and includes reflective mirrors 21a to 21l for further deflecting the second beams (LD1 and LD2) that have been reflected from the polygon mirrors 36a and 36b. Herein, with respect to each photosensitive drum 10, three reflective mirrors from among the reflective mirrors 21a to 21l are disposed. Meanwhile, the optical scanning device 20 is configured to be an opposite-scanning tandem-type color optical system.

Figure 7:
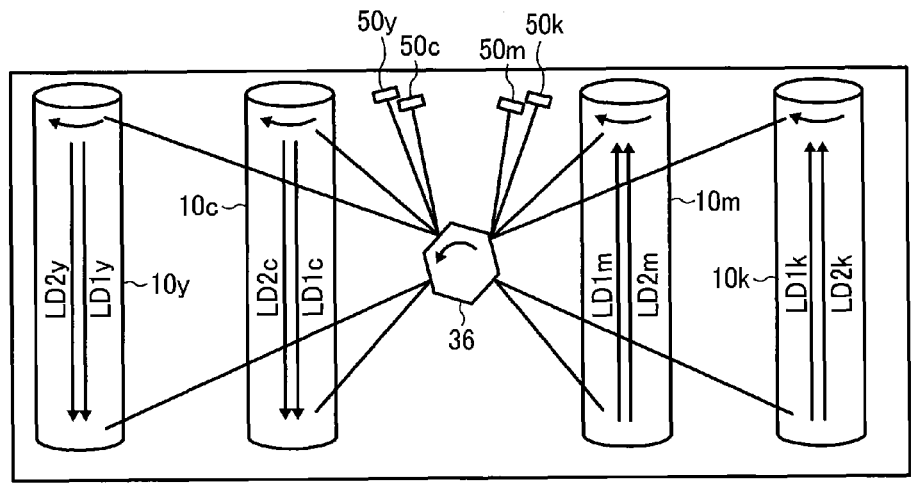
FIG. 7 is an illustrative diagram of a configuration of a conventional opposite-scanning tandem-type color optical system.

As compared with a conventional opposite-scanning tandem-type color optical system illustrated in FIG. 7, the optical scanning device 20 differs in that two LDBs 50 are disposed in the embodiment. Herein, FIG. 7 is an illustrative diagram of a conventional opposite-scanning tandem-type color optical system. As illustrated in FIG. 7, the conventional opposite-scanning tandem-type color optical system includes four LDBs 50 (i.e., an LDB 50y, an LDB 50c, an LDB 50m, and an LDB 50k) that are equal in number to the number of photosensitive drums. In contrast, in the present embodiment, since the light source 30 mounted on each LDB 50 is used for image formation in a plurality of colors; the number of light sources 30 can be smaller than the number of photosensitive drums 10.

As illustrated in FIG. 6, the sequence of superimposing the toner images of a plurality of colors on the transfer paper sheet 40 is the same as the conventional sequence. That is, on the transfer paper sheet 40, toner images of four colors, namely, yellow (Ye), Cyan (Cy), magenta (Ma), and black (Bk) are superimposed in that order thereby resulting in the formation of a color image. Moreover, as illustrated in FIG. 6, two photosensitive drums 10 are disposed on the left side of the deflecting unit 36 and two photosensitive drums 10 are disposed on the right side of the deflecting unit 36. The second beams reflected from the polygon mirror 36a are deflected at the reflective mirrors 21a to 21l and scanned on the photosensitive drums 10. In FIG. 6, from among the second beams deflected at the polygon mirror 36a, second beams LD1y and LD2y are scanned on the photosensitive drum 10y and second beams LD1k and LD2k are scanned on the photosensitive drum 10k. Similarly, from among the second beams deflected at the polygon mirror 36b, second beams LD1c and LD2c are scanned on the photosensitive drum 10c and second beams LD1m and LD2m are scanned on the photosensitive drum 10m. In the following explanation, the second beams are referred to as only LD1 and LD2; and only when it is necessary to identify specific second beams, the color (y, c, m, or k) of the relevant photosensitive drum 10 is appended.

Thus, in FIG. 6, the LDB 50a emits the second beams LD1 and LD2 that are scanned on the photosensitive drums 10y and 10c disposed on the left side of the deflecting unit 36. Similarly, the LDB 50b emits the second beams LD1 and LD2 that are scanned on the photosensitive drums 10m and 10k disposed on the right side of the deflecting unit 36.

As another example, the configuration can be such that one of the LDBs 50 can emit the second beams LD1 and LD2 that are scanned on the photosensitive drums disposed on the near side of the deflecting unit 36 and the other LDB 50 can emit the second beams LD1 and LD2 that are scanned on the photosensitive drums disposed on the far side of the deflecting unit 36. For example, with reference to FIG. 6, one of the LDBs 50 can emit the second beams LD1 and LD2 that are scanned on the photosensitive drums 10c and 10m disposed on the near side of the deflecting unit 36; while the other LDB 50 can emit the second beams LD1 and LD2 that are scanned on the photosensitive drums 10y and 10k disposed on the far side of the deflecting unit 36.

Regarding the lines corresponding to the yellow and cyan colors on the left side of the deflecting unit 36, the second beam LD2 precedes in the sub-scanning direction with respect to the transfer paper sheet 40 and the second beam LD1 follows in the sub-scanning direction with respect to the transfer paper sheet 40. Regarding the lines corresponding to the magenta and black colors on the right side of the deflecting unit 36, the second beam LD1 precedes in the sub-scanning direction with respect to the transfer paper sheet 40 and the second beam LD2 follows in the sub-scanning direction with respect to the transfer paper sheet 40.

Figure 8:
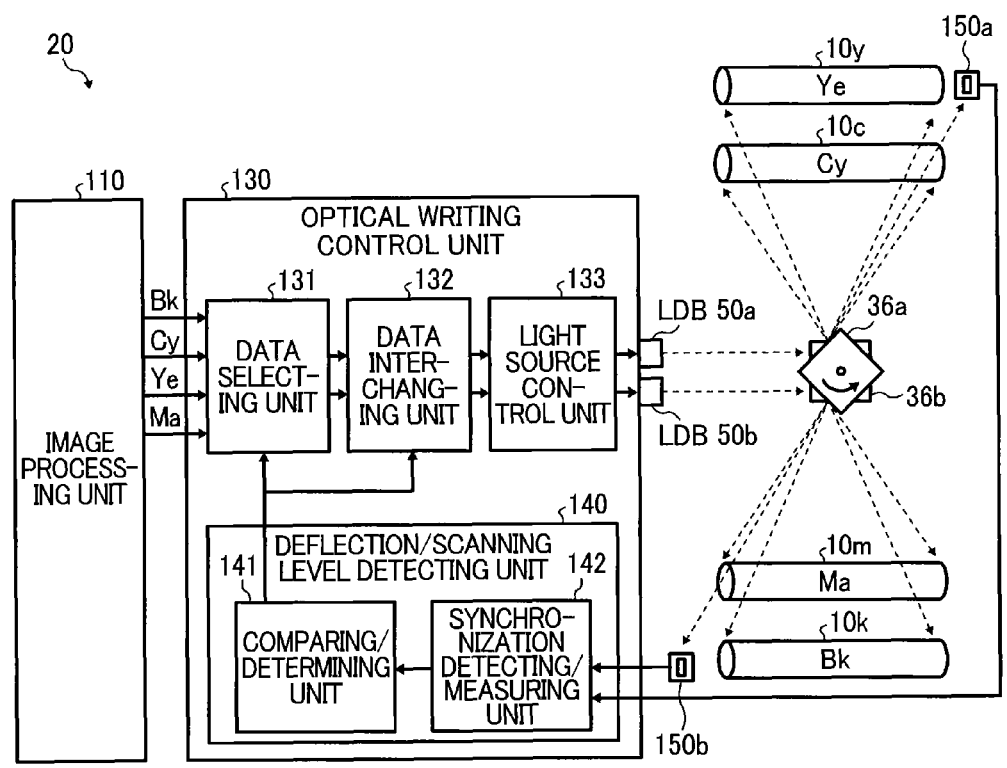
FIG. 8 is a functional block diagram of an optical writing control unit according to the first embodiment.

Explained below are the details regarding the functions of the optical scanning device 20. Herein, the optical scanning device 20 includes an optical writing control unit 130. FIG. 8 is a functional block diagram of the optical writing control unit 130. As illustrated in FIG. 8, the optical writing control unit 130 mainly includes a data selecting unit 131, a data interchanging unit 132, a light source control unit 133, a deflection/scanning level detecting unit 140, the LDBs 50a and 50b, and light receiving elements 150a and 150b.

The light source control unit 133 feeds modulated signals to the LDBs 50a and 50b, and controls the beams emitted from the LDBs 50a and 50b toward the polygon mirrors 36a and 36b. The light source control unit 133 ensures that the beams emitted from the LDBs 50a and 50b are scanned in the direction of the polygon mirrors 36a and 36b, and ensures that the photosensitive drums 10y to 10k are scanned by the second beams via the first scanning lenses 37a and 37b and the mirror 38.

The light receiving element 150a is disposed at a scanning front-end location of the photosensitive drum 10y corresponding to the yellow color and the photosensitive drum 10c corresponding to the cyan color. The light receiving element 150a detects the beams reflected from the deflecting unit 36 as synchronization detecting signals that indicate the writing positions of main-scanning on the photosensitive drums 10y and 10c. Similarly, the light receiving element 150b is disposed at a scanning front-end location of the photosensitive drum 10m corresponding to the magenta color and the photosensitive drum 10k corresponding to the black color. The light receiving element 150b detects the beams reflected from the deflecting unit 36 as synchronization detecting signals that indicate the writing positions of main-scanning on the photosensitive drums 10m and 10k.

A synchronization detecting/measuring unit 142 includes a counter (not illustrated) that has a control clock for measuring the time intervals between the synchronization detection signals detected by the light receiving elements 150. With the use of the control clock, the counter measures the detection intervals between the synchronization detection signals and outputs the detection intervals to a comparing/determining unit 141. Herein, the control clock in the counter is assumed to control the light sources 30 on the basis of single pixel units. Thus, the control clock is a high-speed clock that operates at the frequency of about 10 MHz in a low-end device and operates at the frequency of about 200 MHz in a high-end device.

The comparing/determining unit 141 compares the detection intervals measured by the synchronization detecting/measuring unit 142 with a predetermined value; and determines whether the synchronization detecting signals represent the beams reflected from the polygon mirror 36a or the beams reflected from the polygon mirror 36b. Then, to the data selecting unit 131 and the data interchanging unit 132, the comparing/determining unit 141 outputs a deflection/scanning level signal that indicates whether the determination result points to the beams reflected from the polygon mirror 36a or the beams reflected from the polygon mirror 36b.

As the predetermined value, one of the following can be used: a threshold value for determining the upper and lower level polygon mirrors from among the polygon mirrors 36a and 36b; a fixed value; and the value measured most previously by the synchronization detecting/measuring unit 142. For example, assume that a time interval Ta represents the time interval starting from the synchronization detecting signal detected when the light receiving element 150a detects a beam reflected from the polygon mirror 36a up to the synchronization detecting signal detected when the light receiving element 150a detects a beam reflected from the polygon mirror 36b, and assume that a time interval Tb represents the time interval starting from the synchronization detecting signal detected when the light receiving element 150a detects a beam reflected from the polygon mirror 36b up to the synchronization detecting signal detected when the light receiving element 150a detects a beam reflected from the polygon mirror 36a. Then, the average value (Ta+Tb)/2 can be set as the fixed value.

Moreover, for example, the comparing/determining unit 141 can determine the predetermined value to be the value measured most previously by the synchronization detecting/measuring unit 142. The comparing/determining unit 141 then compares the most previous measurement result and the current measurement result of the synchronization detecting/measuring unit 142. If the current measurement result is greater, then the comparing/determining unit 141 determines that the polygon mirror 36b was scanned. On the other hand, if the current measurement result is smaller, then the comparing/determining unit 141 determines that the polygon mirror 36a was scanned. In an optical system device in which the time interval Tb is longer than the time interval Ta, the measurement result of the synchronization detecting/measuring unit 142 corresponds to the longer time interval and the shorter time interval in an alternately repeating manner. Hence, the comparing/determining unit 141 can make the above-mentioned decision.

Based on the deflection/scanning level signal output by the comparing/determining unit 141; the data selecting unit 131 selects, from among the image data obtained from an image processing unit 110, the image to be scanned at the next time by the light source control unit 133. Depending on the arrangement of the optical scanning device 20 and the photosensitive drums 10, the data selecting unit 131 decides on the toner colors during the image formation of the selected image data by means of scanning performed by the LDBs 50a and 50b.

For example, based on the deflection/scanning level signal output by the comparing/determining unit 141, the data selecting unit 131 performs synthesis so as to include the image data of two colors in the image data scanned by one of the LDBs 50. Herein, it is assumed that one of the LDBs 50 is used for image formation in black and magenta colors, while the other LDB 50 is used for image formation in yellow and cyan colors. For example, the data selecting unit 131 includes the black and magenta colors in the image data scanned by the LDB 50a, includes the yellow and cyan colors in the image data scanned by the LDB 50b, synthesizes the image data, and outputs the synthesized image data to the data interchanging unit 132.

As another example, based on the deflection/scanning level signal output by the comparing/determining unit 141; the data selecting unit 131 selects, from among the image data obtained from the image processing unit 110, the image to be scanned at the time after next by the light source control unit 133. Because of that, it becomes possible to secure sufficient time for the data interchanging unit 132 to perform the data interchanging operation. That allows the data interchanging unit 132 to promptly output the data to the light source control unit 133.

Based on the deflection/scanning level signal output by the comparing/determining unit 141, the data interchanging unit 132 processes the image data synthesized by the data selecting unit 131. If the image data synthesized by the data selecting unit 131 has predetermined colors, then the data interchanging unit 132 interchanges the arrays of image data formed by the LDBs 50a and 50b, and outputs the post-interchanging image data to the light source control unit 133.

Explained below is an example of interchanging the arrays of the synthesized image data. Depending on the layout configuration of the optical scanning device 20, there are times when the sequence of beam alignment in the sub-scanning direction with respect to the transfer paper sheet 40 may differ. For example, in the optical system layout illustrated in FIG. 6, with respect to the photosensitive drums 10m and 10k of the magenta and black colors, respectively; the second beam LD1 from among the second beams LD1 and LD2 precedes in the sub-scanning direction with respect to the transfer paper sheet 40. On the other hand, with respect to the photosensitive drums 10y and 10c of the yellow and cyan colors, respectively; the second beam LD2 from among the second beams LD1 and LD2 precedes in the sub-scanning direction with respect to the transfer paper sheet 40. In such an optical system, unless the arrays of image data corresponding to the yellow and cyan colors are interchanged, the color image output becomes unsuitable with respect to the transfer paper sheet 40.

Therein, based on the deflection/scanning level signal output by the comparing/determining unit 141, the data interchanging unit 132 outputs the image data of the magenta and black colors as per the line arrays output by the data selecting unit 131. However, with respect to the line arrays of the image data of yellow and cyan colors output by the data selecting unit 131, the data interchanging unit 132 interchanges the arrays of image data in such a way that the data in the first line is changed to the second beam LD2 and the data in the second line is changed to the second beam LD1, and outputs the post-interchanging data to the light source control unit 133.

Figure 9:
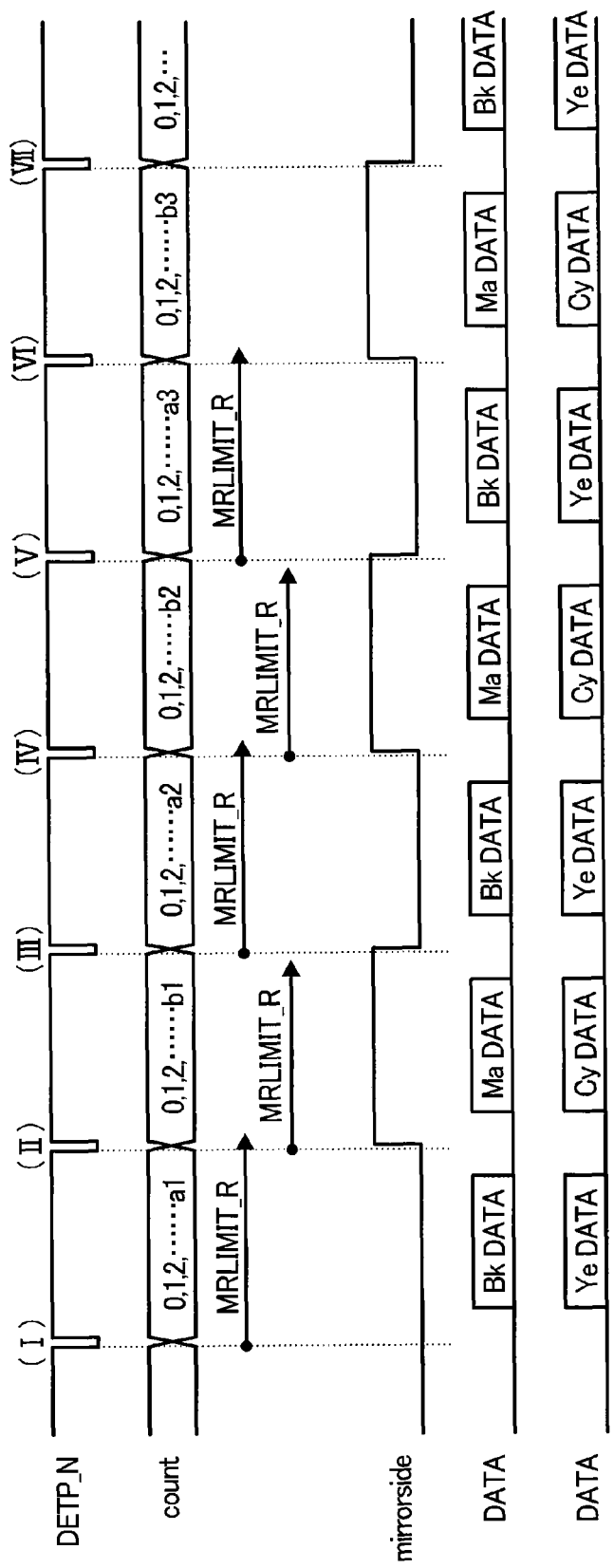
FIG. 9 is a timing chart of the timings in the determining operation performed by a comparing/determining unit according to the first embodiment.

Explained below are the details of the operations performed by the comparing/determining unit 141. FIG. 9 is a timing chart of the timings in the determining operation performed by the comparing/determining unit 141.

In FIG. 9, "DETP_N" represents synchronization detecting signals output by the light receiving elements 150 illustrated in FIG. 8. Consider the conventional case when a beam (first beam) emitted by a single light source is not split but is subjected to scanning at a single polygon mirror having single-level mirror sides. In that case, for scanning of each side of the polygon mirror, a single synchronization detecting signal (hereinafter, also referred to as "DETP_N signal") is detected. In contrast, in the first embodiment, the first beam emitted from a single light source 30 is split into two second beams and each of the two second beams are individually subjected to scanning at the polygon mirrors 36a and 36b. Consequently, for scanning of each side of each of the polygon mirrors 36a and 36b, two synchronization detecting signals are detected.

In the case of setting a fixed value as the predetermined value, the comparing/determining unit 141 compares a fixed value (MRLIMIT_R) with the value measured by an input timing counter for the DETP_N. If the measured value is equal to or greater than the fixed value, then the comparing/determining unit 141 sets the deflection/scanning level signal (hereinafter, referred to as "mirrorside") to a low state; and if the measured value is smaller than the fixed value, then the comparing/determining unit 141 sets the mirrorside to a high state. More particularly, if the value measured by the input timing counter for the DETP_N signal is equal to or greater than the fixed value, then the comparing/determining unit 141 sets mirrorside to "0" indicating the low state; while if the measured value is smaller than the fixed value, then the comparing/determining unit 141 sets the mirrorside to "1" indicating the high state. In FIG. 9, the time interval between DETP_N signals at (I) and (II) is smaller than the fixed value (MRLIMIT_R). Hence, upon receiving the DETP_N signal at (II), the mirrorside is set to the high state.

As another example, consider the case of setting the value measured most previously by the synchronization detecting/measuring unit 142 as the predetermined value. In that case, upon receiving the DETP_N signal at (III), the comparing/determining unit 141 compares "a1" representing the most previous value with "b1" representing the current value. If the current value b1 is greater, then the comparing/determining unit 141 sets the mirrorside to the low state. Moreover, once the DETP_N signal at (IV) is received, "b1" represents the most previous value and "a2" represents the current value. If the current value a2 is smaller than the most previous value b1, then the comparing/determining unit 141 sets the mirrorside to the high state.

Although not illustrated in FIG. 9, in the case when the comparing/determining unit 141 sets the fixed value (MR-LIMIT_R) as the predetermined value, the fixed value happens to have been stored in a memory unit (not illustrated) of the optical writing control unit 130. For example, as the fixed value, such a value is stored in advance in the memory unit that enables determination of the upper and lower polygon mirrors (36a and 36b) from the time intervals between synchronization detecting signals. Moreover, in preparation for a case when the rotating speed of the photosensitive drums 10 is changed, an arbitrary value can be stored in the memory unit so that the fixed value can be changed according to the variation width in the time intervals between synchronization detecting signals.

In FIG. 9, every time the DETP_N signal is input, the comparing/determining unit 141 changes the mirrorside between the high and low states. Based on the mirrorside, the data selecting unit synthesizes the image data of two colors. For example, in the case of synthesizing the images of black and magenta colors, the data selecting unit 131 assumes that the black data is scanned at the polygon mirror 36a and the magenta data is scanned at the polygon mirror 36b. At that time, if the mirrorside is set to the low state, the data selecting unit 131 selects the black (Bk) data; if the mirrorside is set to the high state, the data selecting unit 131 selects the magenta (Ma) data; and synthesizes a modulation signal driving the LDB 50b. Regarding the yellow (Ye) and cyan (Cy) data too, the data selecting unit 131 synthesizes a modulation signal.

Figure 10:
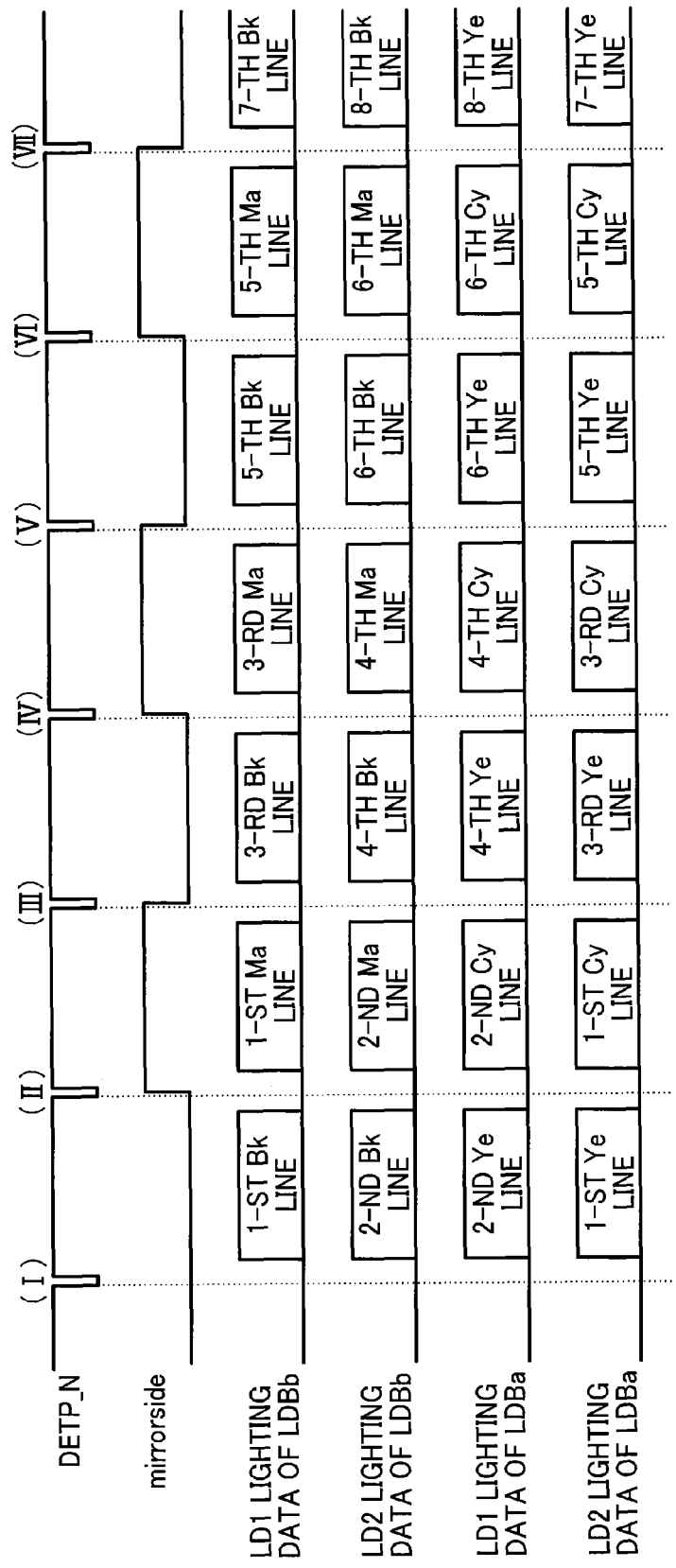
FIG. 10 is a timing chart of the timings in the data interchanging operation performed by a data interchanging unit according to the first embodiment.

Explained below are the details of the data interchanging operation performed by the data interchanging unit 132. FIG. 10 is a timing chart of the timings in the data interchanging operation performed by the data interchanging unit 132. In FIG. 10, "mirrorside" represents the deflection/scanning level signal output by the comparing/determining unit 141. Herein, "mirrorside=0" indicates the timing at which the photosensitive drums on the side of the polygon mirror 36a are exposed to light, and "mirrorside=1" indicates the timing when the photosensitive drums on the side of the polygon mirror 36b are exposed to light. Based on whether "mirrorside=0" or "mirrorside=1", the data selecting unit 131 synthesizes the yellow (Ye) data and the cyan (Cy) data in the lighting data of the LDB 50a, and synthesizes the black (Bk) data and the magenta (Ma) data in the lighting data of the LDB 50b.

Consider the case where the photosensitive drums 10 and the optical scanning device 20 have the positional relationship as illustrated in FIG. 6. In that case, regarding the black (Bk) and magenta (Ma) image data, the second beam LD1 precedes in the sub-scanning direction. Regarding the yellow (Ye) and cyan (Cy) image data, the second beam LD2 precedes in the sub-scanning direction. In such an arrangement as illustrated in the timing chart in FIG. 10, from among the image data input from the data selecting unit 131, the data interchanging unit 132 does not interchange the scanning sequence regarding the black (Bk) and magenta (Ma) image data; but interchanges the scanning sequence regarding the yellow (Ye) and cyan (Cy) image data, and then outputs the image data. Thus, regarding the yellow (Ye) and cyan (Cy) image data, the data interchanging unit 132 interchanges the connections between the second beams LD1 and LD2. More particularly, with respect to the second beam LD1, the data interchanging unit 132 connects the non-preceding data, namely, the second line, the fourth line, and the sixth line in the sub-scanning direction; with respect to the second beam LD2, the data interchanging unit 132 connects the preceding data, namely, the first line, the third line, and the fifth line in the sub-scanning direction; and then outputs the data to the light source control unit 133.

Figure 11:
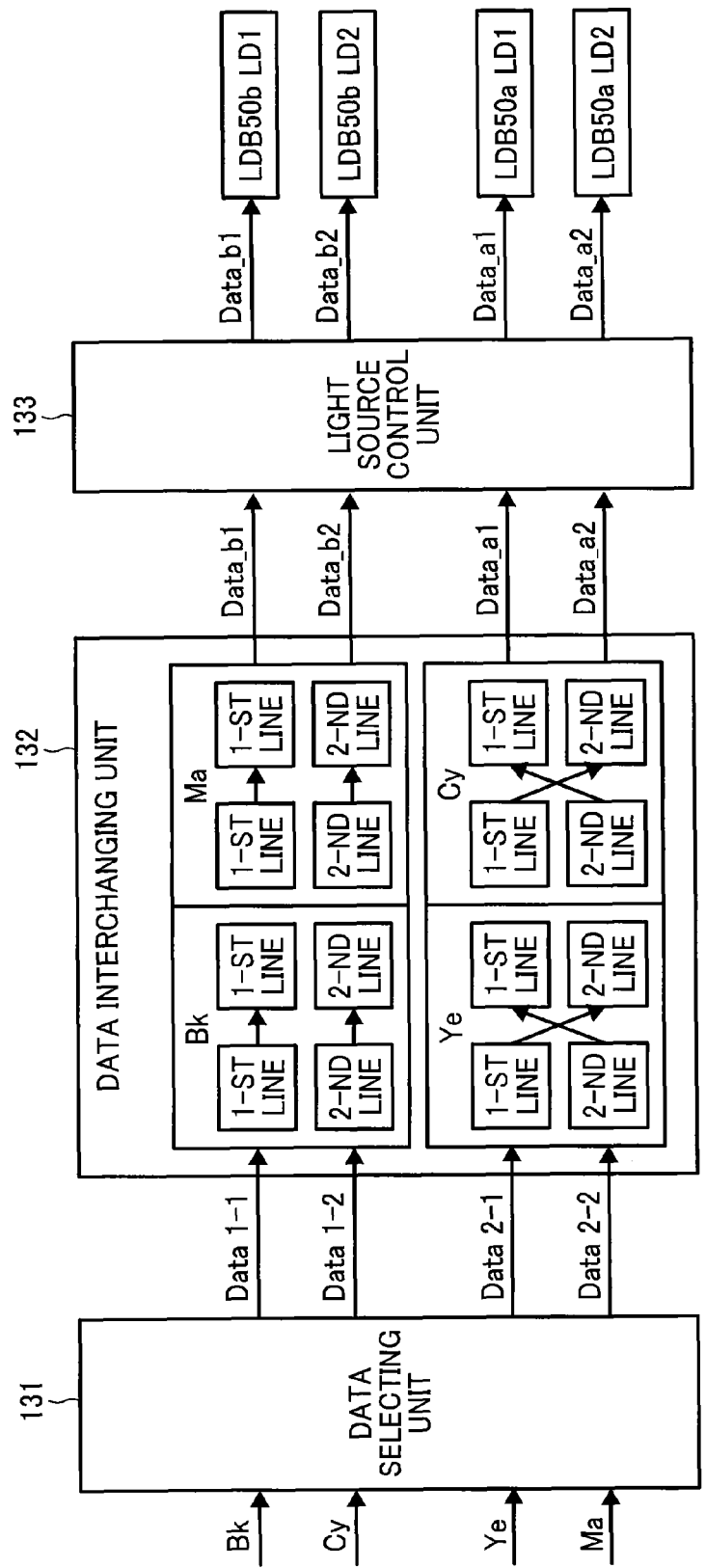
FIG. 11 is an illustrative diagram of exemplary image paths subjected to interchanging in FIG. 10 by the data interchanging unit according to the first embodiment.

Explained below are the details of image paths subjected to interchanging by the data interchanging unit 132. FIG. 11 is an illustrative diagram of exemplary image paths subjected to interchanging in FIG. 10 by the data interchanging unit 132. Firstly, to the data interchanging unit 132, the data selecting unit 131 outputs the image data obtained by synthesizing the black (Bk) and magenta (Ma) image data to Data 1-1 and Data 1-2, and outputs the image data obtained by synthesizing the yellow (Ye) and cyan (Cy) image data to Data 2-1 and Data 2-2.

In FIG. 11, in the yellow (Ye) and cyan (Cy) image data, the data interchanging unit 132 interchanges the preceding lines and non-preceding lines. Then, the data interchanging unit 132 performs data inversion of the image data corresponding to an LDB 50a_LD1 and an LDB 50a_LD2. As a result, the image data output from the LDB 50a is interchanged at each line so that the photosensitive drums 10 get exposed to light at appropriate positions by the plurality of beams emitted from the LDBs 50a and 50b. Hence, it can be ensured that the color image obtained by image formation has the line alignment in the sub-scanning direction identical to the image data obtained by the image processing unit 110 from a scanner.

In this way, according to the first embodiment, based on the deflection/scanning level signal; the data interchanging unit 132 interchanges the data arrays, which are included in the image data obtained from the data selecting unit 131, into appropriate data arrays conforming to the colors scanned by the LDBs 50. That eliminates the need to mount a light source (control board) for each color as is the conventional case. Hence, even when image formation in a plurality of colors is performed using a single light source (control board), no misalignment occurs in the data arrays in the sub-scanning direction with respect to a transfer paper sheet so that image formation can be performed in an appropriate manner. Thus, in an optical system in which image formation in a plurality of colors is performed using a single light source; without having to increase the number of various different components, the image data can be subjected to image formation in accordance with the alignment of each beam in the sub-scanning direction with respect to the transfer paper sheet 40.

Moreover, according to the first embodiment, two first beams are emitted from the light sources 30 and each first beam is further split into two second beams thereby making the total number of second beams equal to four. Since writing of the image data on the photosensitive members is performed using four second beams, it becomes possible to increase the writing speed.

Second Embodiment

In the optical scanning device 20 according to the first embodiment; with respect to each photosensitive drum 10, three reflective mirrors 21 are disposed for the purpose of deflecting the second beams that have been reflected from the polygon mirrors 36a and 36b. In contrast, in an optical scanning device 220 according to a second embodiment of the present invention, the number of reflective mirrors 21 disposed with respect to the photosensitive drums 10 positioned on the outward side of the polygon mirrors 36a and 36b is different than the number of reflective mirrors 21 disposed with respect to the photosensitive drums 10 positioned on the inward side of the polygon mirrors 36a and 36b. Meanwhile, in the second embodiment, the image forming apparatus 100 has the same configuration as described in the first embodiment.

Figure 12:
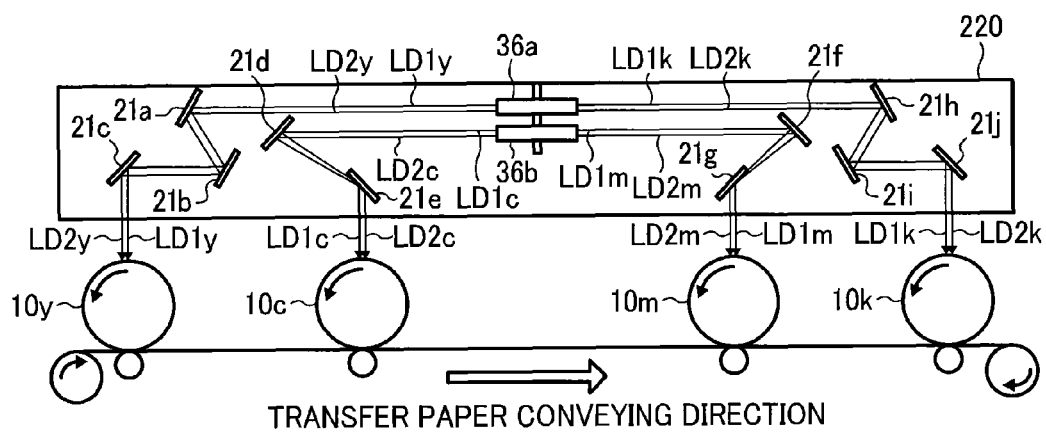
FIG. 12 is an illustrative diagram for explaining the operations performed between an optical scanning device and photosensitive drums according to a second embodiment of the present invention.
Figure 12:
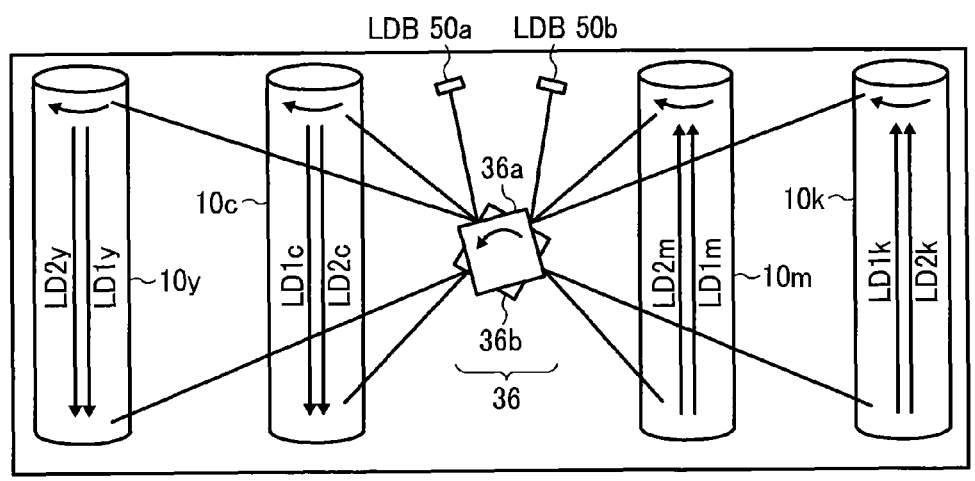

Explained below are the operations performed between the optical scanning device 220 and the photosensitive drums 10 according to the second embodiment. FIG. 12 is an illustrative diagram for explaining the operations performed between the optical scanning device 220 and the photosensitive drums 10 according to the second embodiment. As illustrated in FIG. 12, the optical scanning device 220 includes the LDBs 50a and 50b, the polygon mirrors 36a and 36b for reflecting the second beams LD1 and LD2 emitted from the LDBs 50a and 50b, and reflective mirrors 21a to 21j for further deflecting the second beams LD1 and LD2 that have been reflected from the polygon mirrors 36a and 36b. Meanwhile, in an identical manner to the first embodiment, the optical scanning device 220 is configured to be an opposite-scanning tandem-type color optical system.

As far as the reflective mirrors 21 are concerned in the optical scanning device 220 illustrated in FIG. 12; with respect to each of the photosensitive drums 10y and 10k positioned on the outward side of the polygon mirrors 36a and 36b, three reflective mirrors 21 (i.e., reflective mirrors 21a to 21c and reflective mirrors 21h to 21j, respectively) are disposed. However, with respect to each of the photosensitive drums 10c and 10m positioned on the inward side of the polygon mirrors 36a and 36b, only two reflective mirrors 21 (i.e., reflective mirrors 21d to 21e, and reflective mirror 21f and 21g, respectively) are disposed. Thus, the number of reflective mirrors 21 disposed with respect to each of the photosensitive drums 10y and 10k positioned on the outward side of the polygon mirrors 36a and 36b differs by one as compared to the number of reflective mirrors 21 disposed with respect to each of the photosensitive drums 10c and 10m positioned on the inward side of the polygon mirrors 36a and 36b.

In the optical scanning device 220 configured to have a difference of one in the number of reflective mirrors 21 as described above; regarding the black (Bk) and magenta (Ma) image data, the second beam LD1 precedes and the second beam LD2 follows in the sub-scanning direction with respect to the transfer paper sheet 40. In contrast, regarding the yellow (Ye) and cyan (Cy) image data, the second beam LD2 precedes and the second beam LD1 follows in the sub-scanning direction with respect to the transfer paper sheet 40.

In this way, in a multibeam-type opposite scanning optical system in which a plurality of light sources are installed for image formation, the configuration of the optical system or the configuration of the optical components may lead to a situation in which each beam has a different alignment in the sub-scanning direction with respect to the transfer paper sheet 40. In such a situation, a data interchanging unit needs to interchange data in accordance with the sequence of light-source lines.

Figure 13:
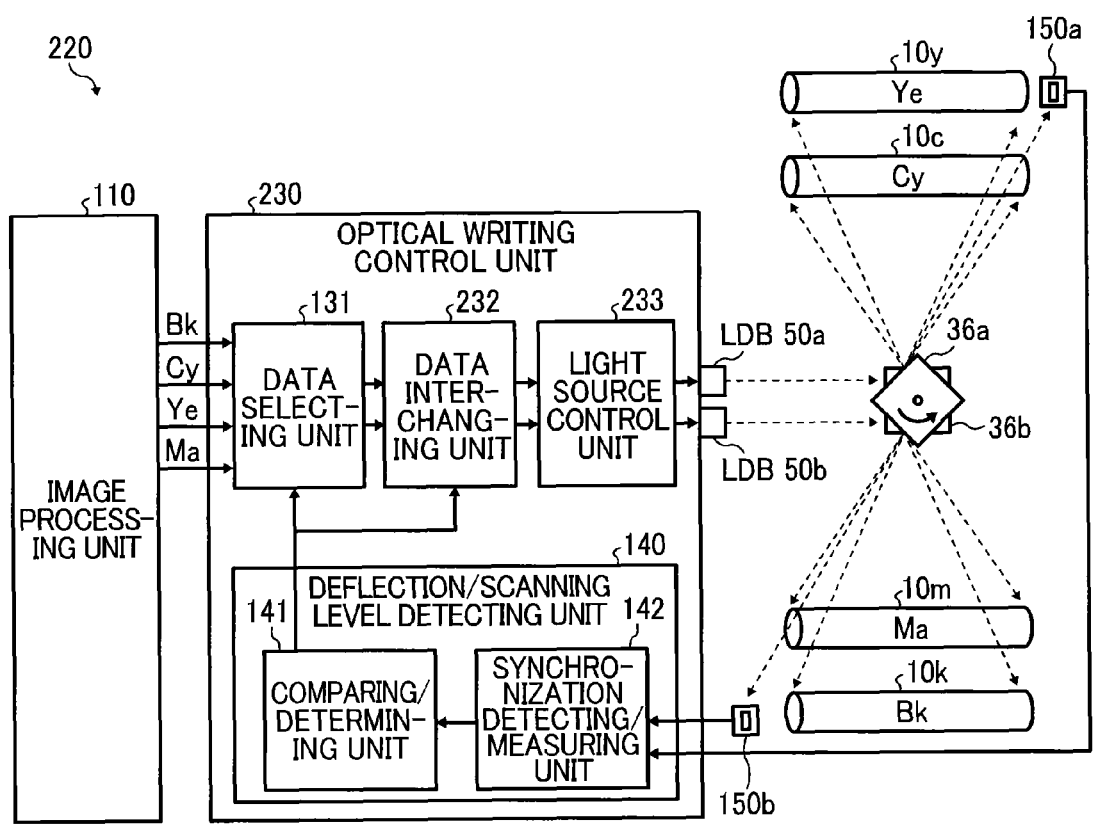
FIG. 13 is a functional block diagram of an optical writing control unit according to the second embodiment.

Explained below are the details regarding the functions of the optical scanning device 220. Herein, the optical scanning device 220 includes an optical writing control unit 230. FIG. 13 is a functional block diagram of the optical writing control unit 230. As illustrated in FIG. 13, the optical writing control unit 230 mainly includes the data selecting unit 131, a data interchanging unit 232, a light source control unit 233, the deflection/scanning level detecting unit 140, the LDBs 50a and 50b, and the light receiving elements 150a and 150b.

The light source control unit 233 ensures that, regarding the black (Bk) and cyan (Cy) image data, the second beam LD1 precedes in the sub-scanning direction; and ensures that, regarding the yellow (Ye) and magenta (Ma) image data, the second beam LD2 precedes in the sub-scanning direction. Consequently, from among the image data obtained from the data selecting unit 131, the data interchanging unit 232 does not interchange the line alignment regarding the black (Bk) and cyan (Cy) image data but interchanges the line alignment regarding the yellow (Ye) and magenta (Ma) image data, and then outputs the image data.

Figure 14:
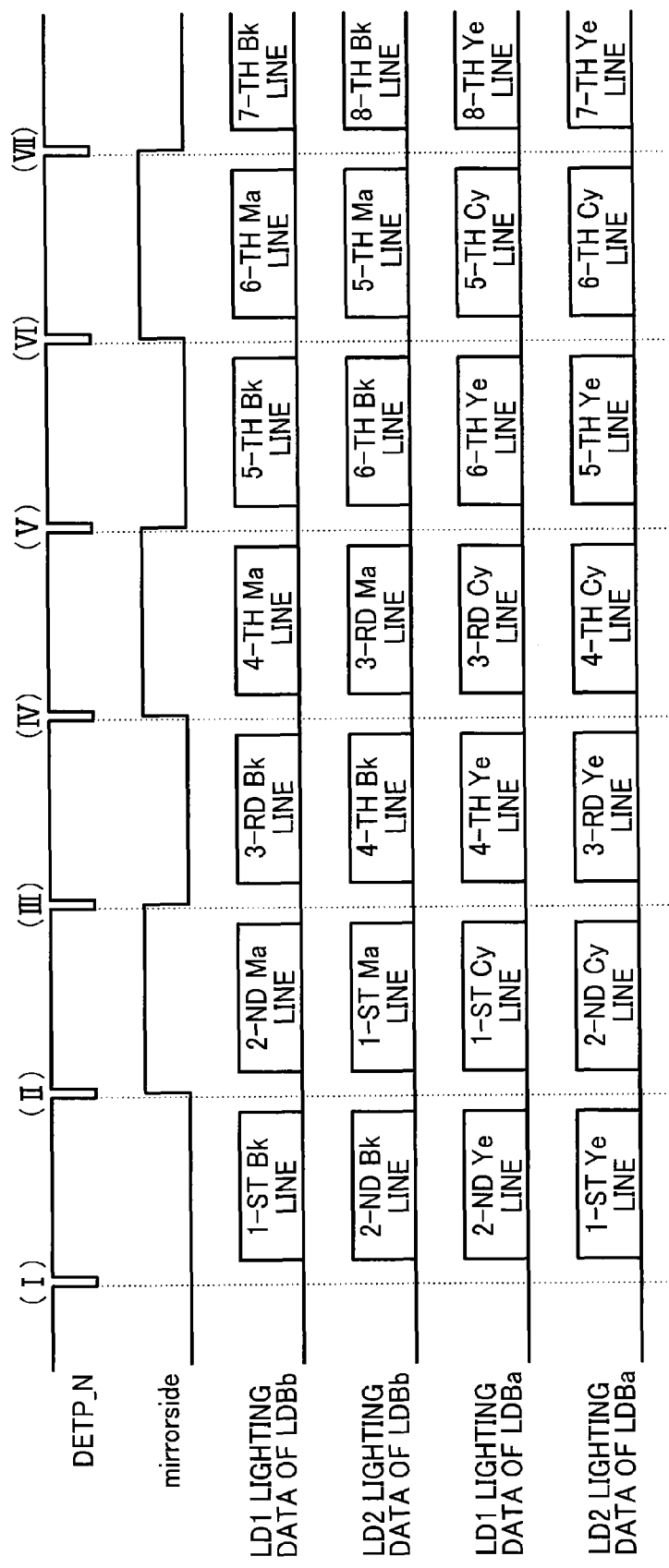
FIG. 14 is a timing chart of the timings in data interchanging operation performed by a data interchanging unit according to the second embodiment.

Explained below are the details of the data interchanging operation performed by the data interchanging unit 232. FIG. 14 is a timing chart of the timings in the data interchanging operation performed by the data interchanging unit 232.

As illustrated in FIG. 14, regarding the yellow (Ye) and magenta (Ma) image data, the data interchanging unit 232 interchanges the connections between the second beams LD1 and LD2. More particularly, with respect to the second beam LD1, the data interchanging unit 232 connects the non-preceding data, namely, the second line, the fourth line, and the sixth line in the sub-scanning direction; with respect to the second beam LD2, the data interchanging unit 232 connects the preceding data, namely, the first line, the third line, and the fifth line in the sub-scanning direction; and then outputs the data to the light source control unit 233.

Figure 15:
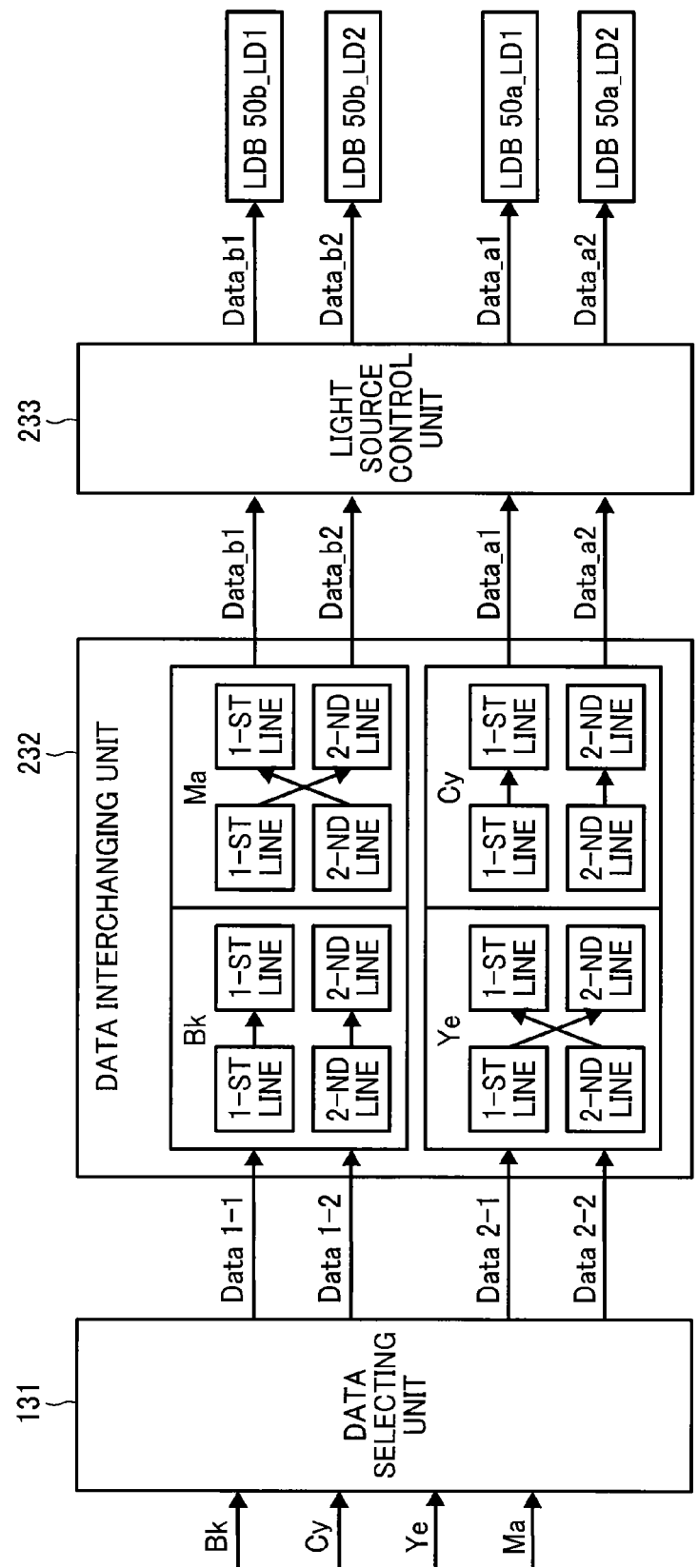
FIG. 15 is an illustrative diagram of exemplary image paths subjected to interchanging in FIG. 14 by the data interchanging unit according to the second embodiment.

Explained below are the details of image paths subjected to interchanging by the data interchanging unit 232. FIG. 15 is an illustrative diagram of exemplary image paths subjected to interchanging in FIG. 14 by the data interchanging unit 232. Firstly, to the data interchanging unit 232, the data selecting unit 131 outputs the image data obtained by synthesizing the black (Bk) and magenta (Ma) image data to the Data 1-1 and the Data 1-2, and outputs the image data obtained by synthesizing the yellow (Ye) and cyan (Cy) image data to the Data 2-1 and the Data 2-2.

In FIG. 15, in the yellow (Ye) and magenta (Ma) image data, the data interchanging unit 232 interchanges the preceding lines and non-preceding lines. Then, the data interchanging unit 232 performs data inversion of the magenta (Ma) image data corresponding to the LDB 50a_LD1 and the LDB 50a_LD2. As a result, the magenta (Ma) image data output from the LDB 50b is interchanged at each line but the black (Bk) image data is not interchanged. Besides, the data interchanging unit 232 performs data inversion of the yellow (Ye) image data corresponding to the LDB 50a_LD1 and the LDB 50a_LD2. As a result, the yellow (Ye) image data output from the LDB 50a is interchanged at each line but the cyan (Cy) image data is not interchanged. In this way, by interchanging the data arrays, the photosensitive drums 10 get exposed to light at appropriate positions by the plurality of beams emitted from the LDBs 50a and 50b. Hence, it can be ensured that the color image obtained by image formation has the line alignment in the sub-scanning direction identical to the image data obtained by the image processing unit 110 from a scanner.

In this way, according to the second embodiment, based on the deflection/scanning level signal; the data interchanging unit 232 interchanges the color arrays, which are included in the image data obtained from the data selecting unit 131, to appropriate data arrays conforming to the colors scanned by the LDBs 50. That eliminates the need to mount a light source (control board) for each color as is in the conventional arts. Hence, even when image formation in a plurality of colors is performed using a single light source (control board), no misalignment occurs in the data arrays in the sub-scanning direction with respect to a transfer paper sheet so that image formation can be performed in an appropriate manner. Thus, in an optical system in which image formation in a plurality of colors is performed using a single light source; without having to increase the number of various different components, the image data can be subjected to image formation in accordance with the alignment of each beam in the sub-scanning direction with respect to the transfer paper sheet 40.

Moreover, according to the second embodiment, two first beams are emitted from the light sources 30 and each first beam is further split into two second beams thereby making the total number of second beams equal to four. Since writing of the image data on the photosensitive members is performed using four second beams, it becomes possible to increase the writing speed.

Modification Example

In the first embodiment, two beams (first beams) are emitted from light sources each having two light emitting units and each first beam is further split into two beams thereby making the total number of split beams (second beams) equal to four. Then, image formation is performed using four second beams. In comparison, in a modification example according to the present invention, two first beams are emitted from light sources each having four light emitting units and each first beam is further split into two beams thereby making the total number of split beams equal to eight. Then, image formation is performed using eight beams. Meanwhile, in the modification example, the image forming apparatus 100 has the same configuration as described in the first embodiment.

Figure 16:
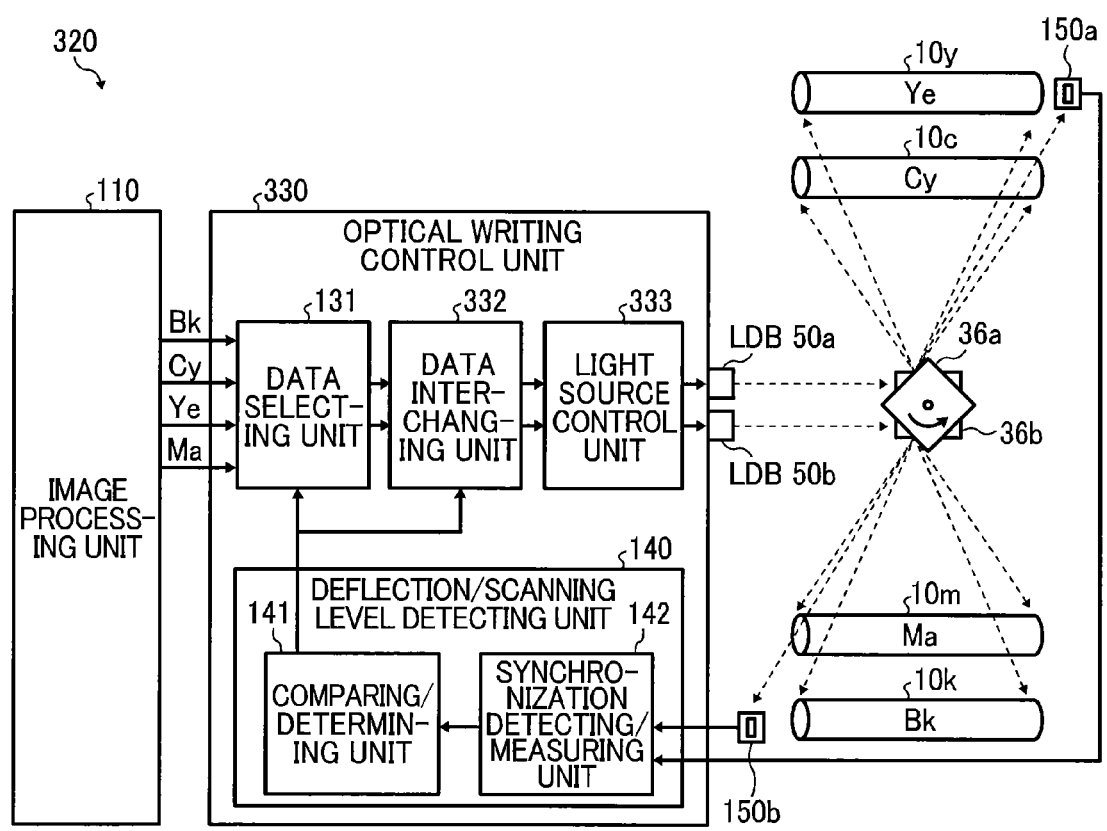
FIG. 16 is a functional block diagram of an optical writing control unit according to a modification example of the present invention.

Explained below are the details regarding the functions of an optical scanning device 320 according to the modification example. Herein, the optical scanning device 320 includes an optical writing control unit 330. FIG. 16 is a functional block diagram of the optical writing control unit 330. As illustrated in FIG. 16, the optical writing control unit 330 mainly includes the data selecting unit 131, a data interchanging unit 332, a light source control unit 333, the deflection/scanning level detecting unit 140, the LDBs 50a and 50b, and the light receiving elements 150a and 150b.

Based on the deflection/scanning level signal output by the comparing/determining unit 141, the data interchanging unit 332 processes the image data synthesized by the data selecting unit 131. If the image data synthesized by the data selecting unit 131 has predetermined colors, then the data interchanging unit 332 interchanges the arrays of image data formed by the LDBs 50a and 50b, and outputs the post-interchanging image data to the light source control unit 333.

Based on the post-interchanging image data output by the data interchanging unit 332, the light source control unit 333 feeds modulated signals to the LDBs 50a and 50b; and controls the beams emitted from the LDBs 50a and 50b toward the polygon mirrors 36a and 36b. The light source control unit 333 ensures that the first beam emitted from each of the LDBs 50a and 50b is split into four second beams that are scanned in the direction of the polygon mirrors 36a and 36b; and ensures that the photosensitive drums 10y to 10k are scanned by the second beams via the first scanning lenses 37a and 37b and the mirror 38.

Thus, even in the case of forming images using four second beams that are divided, the data interchanging unit 332 compares the value output by the comparing/determining unit 141 with a predetermined value, and, if those values are equal, interchanges the colors included in the image data obtained from the data selecting unit 131 in an arbitrary sequence.

Figure 17:
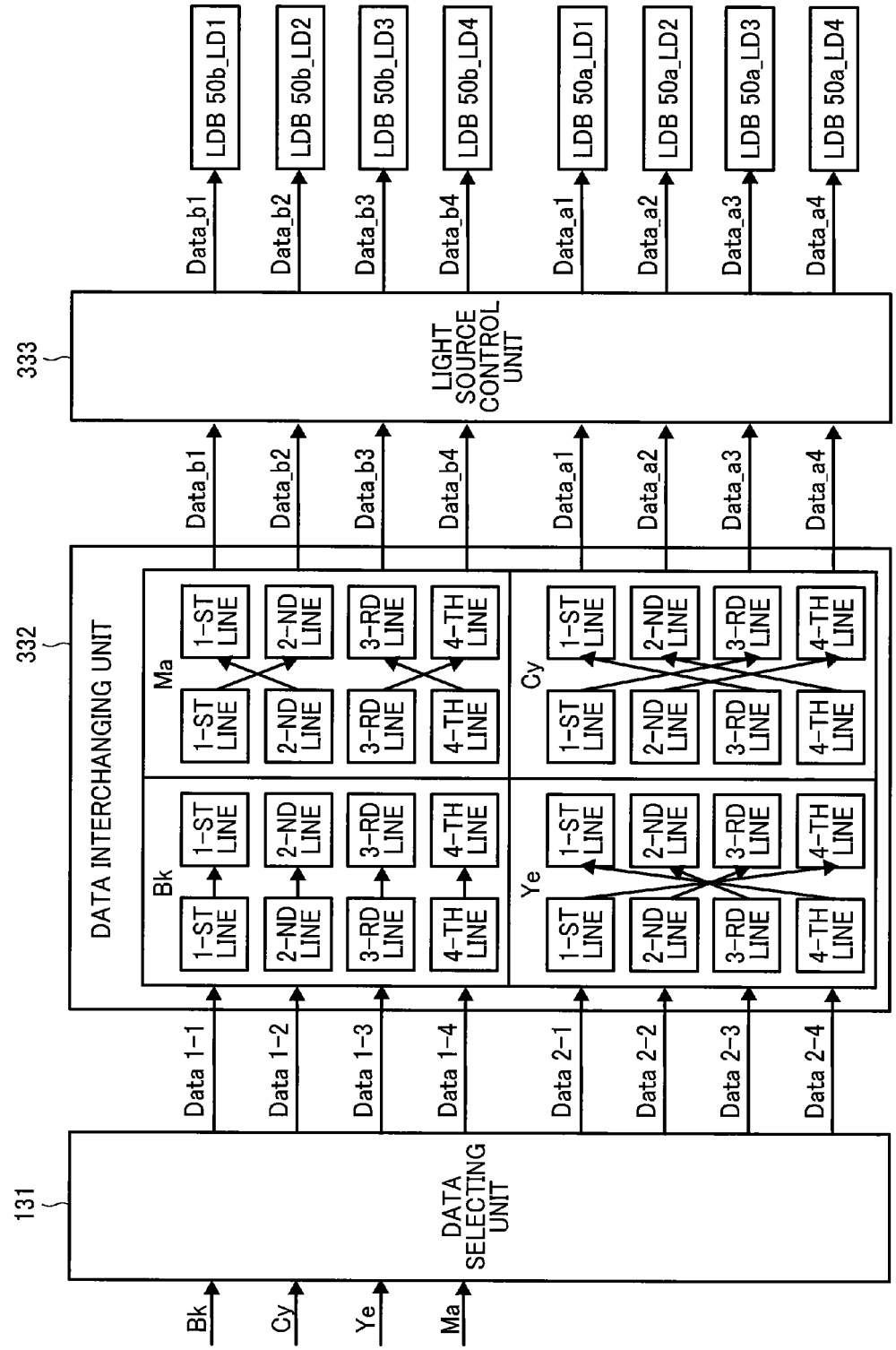
FIG. 17 is an illustrative diagram of exemplary image paths subjected to interchanging by a data interchanging unit according to the modification example.

Explained below are the details of image paths subjected to interchanging by the data interchanging unit 332. FIG. 17 is an illustrative diagram of exemplary image paths subjected to interchanging by the data interchanging unit 332. Firstly, to the data interchanging unit 332, the data selecting unit 131 outputs the image data obtained by synthesizing the black (Bk) and magenta (Ma) image data to Data 1-1 to Data 1-4, and outputs the image data obtained by synthesizing the yellow (Ye) and cyan (Cy) image data to Data 2-1 to Data 2-4.

In FIG. 17, the data interchanging unit 332 performs the data interchanging operation on the image data of magenta (Ma), yellow (Ye), and cyan (Cy) colors within four lines, and interchanges the image data corresponding to LDB 50a_LD1 to LDB 50a_LD4. As a result, the image data of magenta (Ma), yellow (Ye), and cyan (Cy) colors output from the LDBs 50 is interchanged at each line. Consequently, the photosensitive drums 10 get exposed to light at appropriate positions by the plurality of beams emitted from the LDBs 50a and 50b. Hence, it can be ensured that the color image obtained by image formation has the line alignment in the sub-scanning direction identical to the image data obtained by the image processing unit 110 from a scanner.

In this way, according to the modification example, the data interchanging unit 332 compares the data arrays included in the image data obtained from the data selecting unit 131 with predetermined values, and interchanges the data arrays to appropriate data conforming to the colors scanned by the LDBs 50. That eliminates the need to mount a light source (control board) for each color as is in the conventional arts. Hence, even when image formation in a plurality of colors is performed using a single light source (control board), no misalignment occurs in the data arrays in the sub-scanning direction with respect to a transfer paper sheet so that image formation can be performed in an appropriate manner. Thus, in an optical system in which image formation in a plurality of colors is performed using a single light source; without having to increase the number of various different components, the image data can be subjected to image formation in accordance with the alignment of each beam in the sub-scanning direction with respect to the transfer paper sheet 40.

Moreover, according to the modification example, four first beams are emitted from the LDBs 50, and each first beam is further split into two second beams thereby making the total number of second beams equal to eight. Since writing of the image data on the photosensitive members is performed using eight second beams, it becomes possible to increase the writing speed.

Figure 18:
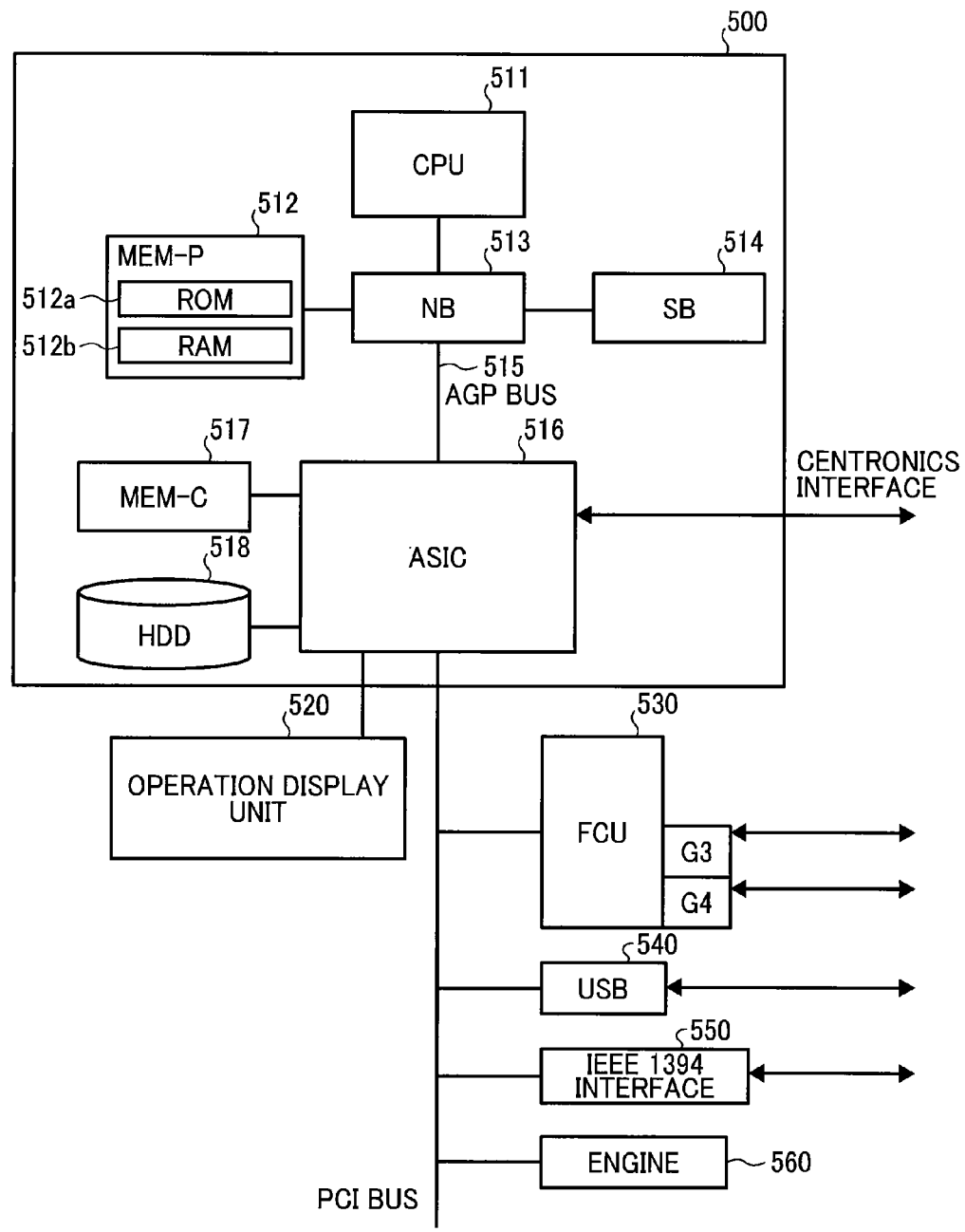
FIG. 18 is a schematic diagram of a hardware configuration of the image forming apparatus according to the first embodiment, the second embodiment, and the modification example.

FIG. 18 is a schematic diagram of a hardware configuration of the image forming apparatus (hereinafter, referred to as "multifunction peripheral 100") according to the first embodiment, the second embodiment, and the modification example. As illustrated in FIG. 18, the multifunction peripheral 100 includes a controller 500 and an engine 560 that are connected by a peripheral component interface (PCI) bus. The controller 500 controls the multifunction peripheral 100 in entirety, as well as controls the drawing function, the communication function, and the input from an operation unit (not illustrated). The engine 560 is a printer engine or the like connectable to the PCI bus; and can be, for example, a black-and-white plotter, a single-drum color plotter, a four-drum color plotter, a scanner, or a facsimileing unit. Besides, along with the engine portion of the plotter, the engine 560 also includes an image processing unit for performing error diffusion or gamma conversion.

The controller 500 includes a central processing unit (CPU) 511, a north bridge (NB) 513, a system memory (MEM-P) 512, a south bridge (SB) 514, a local memory (MEM-C) 517, an application specific integrated circuit (ASIC) 516, and a hard disk drive (HDD) 518. Moreover, an accelerated graphics port (AGP) bus 515 is laid as the connection between the NB 513 and the ASIC 516. The MEM-P 512 includes a read only memory (ROM) 512a and a random access memory (RAM) 512b.

The CPU 511 performs the overall control of the multifunction peripheral 100, and includes a chipset made of the NB 513, the MEM-P 512, and the SB 514. Via that chipset, the CPU 511 is connected to various hardware units.

The NB 513 is a bridge for connecting the CPU 511 to the MEM-P 512, the SB 514, and the AGP bus 515. Moreover, the NB 513 includes a memory controller that controls the reading and writing with respect to the MEM-P 512, and includes a PCI master and an AGP target.

The MEM-P 512 is made of the ROM 512a and the RAM 512b, and functions as a system memory that is used as a storage memory for storing computer programs or data, or as a loading memory for loading computer programs or data, or as a drawing memory of the printer. The ROM 512a is a read-only memory used as a storage memory for storing computer program or data; while the RAM is a loading memory for loading computer programs or data or a drawing memory of the printer that is readable and writable in nature.

The SB 514 is a bridge for connecting the NB 513 with PCI devices or peripheral devices. The SB 514 is connected to the NB 513 via the PCI bus, to which is also connected a network interface (I/F) unit or the like.

The ASIC 516 is an integrated circuit (IC) made of image processing hardware components and designed for the purpose of image processing. The ASIC 516 also plays the role of a bridge for connecting with the AGP bus 515, the PCI bus, the HDD 518, and the MEM-C 517. The ASIC 516 includes a PCI target and an AGP master, includes an arbiter (ARB) that forms the core of the ASIC 516, includes a memory controller for controlling the MEM-C 517, a plurality of direct memory access controllers (DMACs) that perform image data rotation using hardware logic, and includes a PCI unit that communicates data with the engine 560 via the PCI bus. To the ASIC 516 are connected a facsimile control unit (FCU) 530, a universal serial bus (USB) 540, and an IEEE 1394 (the institute of electrical and electronic engineers 1394) interface 550 via the PCI bus. Meanwhile, an operation display unit 520 is connected directly to the ASIC 516.

The MEM-C 517 is a local memory used as a copy image buffer or as a code buffer. The HDD 518 is a storage device for storing image data, computer programs, font data, and forms.

The AGP bus 515 is a bus interface for a graphics accelerator card that has been proposed to enable speeding-up of the graphics processing. With the aim of speeding-up the graphics accelerator card, the AGP bus 515 directly accesses the MEM-P 512 with a high throughput.

In this way, according to an aspect of the present invention, in an optical system in which image formation in a plurality of colors is performed using a single light source; without increasing the number of various different components, the image data can be subjected to image formation in accordance with the alignment of each light beam in the sub-scanning direction with respect to a transfer paper sheet.

Moreover, according to another aspect of the present invention, it becomes possible to increase the speed of writing the image data on photosensitive members.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   an obtaining unit for obtaining color image data;
   a plurality of light sources, each light source emitting a plurality of first beams having colors associated therewith;
   a beam splitting unit for splitting each of the plurality of first beams into second beams;
   a deflecting unit including a plurality of reflecting members, each corresponding to one of the plurality of second beams and each performing deflection scanning of the second beams split from a corresponding first beam;
   an optical system for performing image formation, using the plurality of second beams that have been subjected to deflection scanning, on each of target surfaces for scanning, wherein the target surfaces for scanning have been assigned with different colors corresponding to the first beams from which the second beams are split, and wherein the target surfaces for scanning are provided at opposite sides of the deflecting unit in a sub-scanning direction;
   a light receiving unit for detecting the second beams that have been subjected to deflection scanning;
   a detecting unit for detecting, based on a detection result of the light receiving unit, which of the reflecting members corresponds to the second beam that has been detected;
   an interchanging unit for obtaining, from the color image data, data of a plurality of lines corresponding to each of the plurality of first beams and interchanging the data of the lines that have been obtained based on a detection result of the detecting unit; and
   a light source control unit for controlling the light sources in such a way that the light sources emit the first beams in accordance with the data of the lines that have been interchanged by the interchanging unit.

2. The optical scanning device according to claim 1, wherein
   each of the reflecting members is a polygon mirror,
   a plurality of the polygon mirrors are superposed around the same rotational axis and are mutually shifted by a predetermined angle around the rotational axis, and
   the detecting unit refers to a detection time interval starting from detection of the second beams reflected from one of the plurality of polygon mirrors up to detection of the second beams reflected from another of the plurality of polygon mirrors, and detects which of the reflecting members corresponds to the second beam that has been detected.

3. The optical scanning device according to claim 2, wherein,
   when it is determined that the detected second beam corresponds to predetermined reflecting members from among the plurality of reflecting members, the interchanging members interchanges, from among the data of the lines that has been obtained, the data of the lines corresponding to the colors specified in advance in accordance with the predetermined reflecting members.

4. The optical scanning device according to claim 2, wherein, when it is determined that the detected second beams corresponds to predetermined reflecting members from among the plurality of reflecting members, the interchanging members interchange the data of the lines that have been obtained.

5. The optical scanning device according to claim 2, wherein
   the predetermined angle is equal to "(180°)÷(number of vertex angles in the polygon mirrors)+(a predetermined amount of angle shift)" or equal to "(180°)÷(number of vertex angles in the polygon mirrors)−(the predetermined amount of angle shift)".

6. The optical scanning device according to claim 1, wherein each of the light sources emits two of the first beams.

7. The optical scanning device according to claim 1, wherein the beam splitting unit splits each of the plurality of first beams into two of the second beams.

8. The optical scanning device according to claim 1, wherein
the optical system includes a plurality of reflective plates for reflecting the plurality of second beams that have been subjected to deflection scanning, wherein
the reflective plates perform image formation of the second beams on the target surfaces for scanning that have been assigned with colors corresponding to the first beams from which the second beams are split.

9. The optical scanning device according to claim 8, wherein
the optical system includes the same number of the reflective plates with respect to each of the target surfaces for scanning.

10. The optical scanning device according to claim 8, wherein,
from among the plurality of target surfaces for scanning, there is a difference of one in the number of the reflective mirrors disposed with respect to some of the target surfaces of scanning and the number of the reflective mirrors disposed with respect to a remainder of the target surfaces for scanning.

11. An image forming apparatus comprising:
an image forming device; and
the optical scanning device according to claim 1.

12. The image forming apparatus according to claim 11, wherein
each of the reflecting members is a polygon mirror,
a plurality of the polygon mirrors are superposed around the same rotational axis and are mutually shifted by a predetermined angle around the rotational axis, and
the detecting unit refers to a detection time interval starting from detection of the second beams reflected from one of the plurality of polygon mirrors up to detection of the second beams reflected from another of the plurality of polygon mirrors, and detects which of the reflecting members corresponds to the second beam that has been detected.

13. The image forming apparatus according to claim 12, wherein,
when it is determined that the detected second beam corresponds to predetermined reflecting members from among the plurality of reflecting members, the interchanging members interchanges, from among the data of the lines that has been obtained, the data of the lines corresponding to the colors specified in advance in accordance with the predetermined reflecting members.

14. The image forming apparatus according to claim 12, wherein, when it is determined that the detected second beams corresponds to predetermined reflecting members from among the plurality of reflecting members, the interchanging members interchange the data of the lines that have been obtained.

15. The image forming apparatus according to claim 12, wherein
the predetermined angle is equal to "(180°)÷(number of vertex angles in the polygon mirrors)+(a predetermined amount of angle shift)" or equal to "(180°)÷(number of vertex angles in the polygon mirrors)−(the predetermined amount of angle shift)".

16. The image forming apparatus according to claim 11, wherein each of the light sources emits two of the first beams.

17. The image forming apparatus according to claim 11, wherein the beam splitting unit splits each of the plurality of first beams into two of the second beams.

18. The image forming apparatus according to claim 11, wherein
the optical system includes a plurality of reflective plates for reflecting the plurality of second beams that have been subjected to deflection scanning, wherein
the reflective plates perform image formation of the second beams on target surfaces for scanning that have been assigned with colors corresponding to the first beams from which the second beams are split.

19. The image forming apparatus according to claim 18, wherein
the optical system includes the same number of the reflective plates with respect to each of the target surfaces for scanning.

20. An optical scanning method implemented in an optical scanning device including
a plurality of light sources, each light source emitting a plurality of first beams having colors associated therewith;
a beam splitting unit for splitting each of the plurality of first beams into second beams;
a deflecting unit including a plurality of reflecting members each corresponding to one of the plurality of second beams and each performing deflection scanning of the second beams split from corresponding first beam;
an optical system for performing image formation using the plurality of second beams that have been subjected to deflection scanning, on each of target surfaces for scanning, wherein the target surfaces for scanning have been assigned with different colors corresponding to the first beams from which the second beams are split, and wherein the target surfaces for scanning are provided at opposite sides of the deflecting unit in a sub-scanning direction; and
a light receiving unit for detecting the second beams that have been subjected to deflection scanning,
the optical scanning method comprising:
obtaining color image data;
detecting, based on a detection result of the light receiving unit, which of the reflecting members corresponds to the second beam that has been detected;
performing interchanging that includes obtaining, from the color image data, data of a plurality of lines each corresponding to each of the first beams, and interchanging the data of the lines based on the detected result at the detecting; and
controlling the light sources in such a way that the first beams, corresponding to the data that has been interchanged, are emitted.

* * * * *